(12) United States Patent
Akuzawa et al.

(10) Patent No.: US 9,712,000 B2
(45) Date of Patent: Jul. 18, 2017

(54) RESONANCE TYPE POWER TRANSMISSION DEVICE AND RESONANCE TYPE POWER MULTIPLEX TRANSMISSION SYSTEM

(71) Applicant: Mitsubishi Electric Engineering Company, Limited, Chiyoda-ku (JP)

(72) Inventors: Yoshiyuki Akuzawa, Chiyoda-ku (JP); Yuki Ito, Chiyoda-ku (JP)

(73) Assignee: Mitsubishi Electric Engineering Company, Limited, Chiyoda-ku (JP)

( * ) Notice: Subject to any disclaimer, the term of this patent is extended or adjusted under 35 U.S.C. 154(b) by 0 days.

(21) Appl. No.: 14/910,955

(22) PCT Filed: Aug. 20, 2014

(86) PCT No.: PCT/JP2014/071756
§ 371 (c)(1),
(2) Date: Feb. 8, 2016

(87) PCT Pub. No.: WO2015/025881
PCT Pub. Date: Feb. 26, 2015

(65) Prior Publication Data
US 2016/0197520 A1 Jul. 7, 2016

(30) Foreign Application Priority Data

Aug. 23, 2013 (JP) .................................. 2013-173311
Nov. 15, 2013 (WO) .................. PCT/JP2013/080913

(51) Int. Cl.
*H02J 50/12* (2016.01)
*H02J 50/50* (2016.01)

(52) U.S. Cl.
CPC .............. *H02J 50/12* (2016.02); *H02J 50/50* (2016.02)

(58) Field of Classification Search
CPC .................................. H02J 50/12; H02J 50/50
See application file for complete search history.

(56) References Cited

U.S. PATENT DOCUMENTS 6,317,338 B1 11/2001 Boys
9,318,922 B2 * 4/2016 Hall .......................... B60L 1/00
(Continued)

FOREIGN PATENT DOCUMENTS

EP 2 196 351 A1 6/2010
JP 2002-508916 A 3/2002
(Continued)

OTHER PUBLICATIONS

International Search Report Issued Nov. 11, 2014 in PCT/JP14/071756 Filed Aug. 20, 2014.
(Continued)

*Primary Examiner* — Jared Fureman
*Assistant Examiner* — James Evans
(74) *Attorney, Agent, or Firm* — Oblon, McClelland, Maier & Neustadt, L.L.P.

(57) ABSTRACT

Disclosed is a resonance type power transmission device that transmits electric power by using a resonator for transmission 3 and a resonator for reception 4 whose resonance conditions are matched to each other, the resonance type power transmission device including a transmission power supply 1 to supply electric power, a transmission antenna 2 to transmit the electric power from the transmission power supply 1, a conductive substance 7 to establish an electrical single point connection between the resonator for transmission 3 and the resonator for reception 4, a reception antenna 5 to receive the electric power from the transmission antenna 2 via the resonator for transmission 3 and the resonator for reception 4, and a reception power supply 6 to receive the electric power received by the reception antenna 5.

16 Claims, 26 Drawing Sheets

(56) References Cited

U.S. PATENT DOCUMENTS

| | | | |
|---|---|---|---|
| 2001/0012208 A1* | 8/2001 | Boys | H02J 5/005 363/23 |
| 2005/0020224 A1 | 1/2005 | Locatelli et al. | |
| 2007/0182650 A1 | 8/2007 | Locatelli et al. | |
| 2009/0153273 A1 | 6/2009 | Chen et al. | |
| 2010/0033284 A1* | 2/2010 | Yamakami | H01F 27/324 336/192 |
| 2010/0237709 A1* | 9/2010 | Hall | B60L 11/182 307/104 |
| 2010/0264748 A1* | 10/2010 | Tucker | H01Q 7/00 307/104 |
| 2011/0248879 A1* | 10/2011 | De Wilde | G01S 7/497 342/42 |
| 2013/0026850 A1 | 1/2013 | Throngnumchai et al. | |
| 2013/0069442 A1* | 3/2013 | Kim | H02J 5/005 307/104 |
| 2013/0175872 A1* | 7/2013 | Simon | H02J 5/005 307/104 |
| 2013/0221757 A1* | 8/2013 | Cho | H02J 17/00 307/104 |
| 2013/0229062 A1* | 9/2013 | Bae | H04B 5/0037 307/104 |
| 2014/0028111 A1* | 1/2014 | Hansen | H01F 38/14 307/104 |
| 2014/0191568 A1* | 7/2014 | Partovi | H02J 7/025 307/9.1 |
| 2015/0102685 A1* | 4/2015 | Blood | H02J 5/005 307/104 |

FOREIGN PATENT DOCUMENTS

| | | |
|---|---|---|
| JP | 2005-509356 A | 4/2005 |
| JP | 2010-148273 A | 7/2010 |
| JP | 2011-160634 A | 8/2011 |
| WO | WO 2012/144640 A1 | 10/2012 |

OTHER PUBLICATIONS

Office Action issued Sep. 2, 2016 in Chinese Patent Application No. 201480046548.8 (with English language translation).

Supplementary European Search Report issued May 11, 2017 in European Patent Application No. 14 838 180.9.

* cited by examiner (a)

(b)

(c)

(a)

(b)

(c)

(d)

(a)

(b)

(a)

(b)

(c)

(d)

(e)

(a)

(b)

(a)

(b)

(a)

(b)

RESONANCE TYPE POWER TRANSMISSION DEVICE AND RESONANCE TYPE POWER MULTIPLEX TRANSMISSION SYSTEM

FIELD OF THE INVENTION

The present invention relates to a resonance type power transmission device and a resonance type power multiplex transmission system that transmit electric power by using a resonator for transmission and a resonator for reception whose resonance conditions are matched to each other.

BACKGROUND OF THE INVENTION

Conventionally, a system in which n relay coils (relay antennas) (n is an integer equal to or greater than 1) are disposed between a power transmission coil (transmission antenna) and a power reception coil (reception antenna) in a wireless power transmission device of magnetic resonance type in order to elongate the transmission distance of electric power is known (for example, refer to patent reference 1).

RELATED ART DOCUMENT

Patent Reference

Patent reference 1: Japanese Unexamined Patent Application Publication No. 2011-160634

SUMMARY OF THE INVENTION

Problems to be Solved by the Invention

A problem is, however, that in the case of the method of using relay coils which is disclosed by the patent reference 1, it is necessary to arrange an antenna in such a way that the antenna shares a magnetic flux with an adjacent antenna and, when the transmission distance is long, it is necessary to arrange many relay antennas and hence the transmission device increases in size. Another problem is that because relay antennas are needed, the cost increases.

A further problem is that because the conventional system is configured in such a way as to perform power transmission by making adjacent antennas share a magnetic flux between them, the transmission efficiency degrades extremely in a case in which a magnetic body to block the magnetic flux exists in the transmission path.

A still further problem is that because the conventional system is configured in such a way as to perform power transmission by making adjacent antennas share a magnetic flux between them, a restriction is imposed on the arrangement of antennas.

Further, in a case in which a multiple number of wireless power transmission devices each using the above-mentioned method are disposed, when a relay antenna of a system is located close to a relay antenna of another system, mutual interference occurs between the antennas and hence the transmission efficiency degrades. Therefore, in order to perform multiplex transmission, it is necessary to arrange the relay antennas of the plurality of systems at intervals of twice or more the diameter of each antenna, or to take a magnetic shielding measure to separate the magnetic fluxes of the plurality of systems from one another. A problem is therefore that the power transmission devices cannot be downsized, or a cost is needed to take the magnetic shielding measure, and so on.

The present invention is made in order to solve the above-mentioned problems, and it is therefore an object of the present invention to provide a resonance type power transmission device and a resonance type electric power multiplex transmission device that can be produced at a low cost and downsized and that make it possible to carry out efficient power transmission.

Means for Solving the Problem

In accordance with the present invention, there is provided a resonance type power transmission device that transmits electric power by using a resonator for transmission and a resonator for reception whose resonance conditions are matched to each other, the resonance type power transmission device including: a transmission power supply to supply electric power; a transmission antenna to transmit the electric power from the transmission power supply; a conductive substance to establish an electrical single point connection between the resonator for transmission and the resonator for reception; a reception antenna to receive the electric power from the transmission antenna via the resonator for transmission and the resonator for reception; and a reception power supply to receive the electric power received by the reception antenna.

Advantages of the Invention

Because the resonance type power transmission device in accordance with the present invention is configured as above, the resonance type power transmission device can be produced at a low cost and downsized, and makes it possible to carry out efficient power transmission.

EMBODIMENTS OF THE INVENTION

Hereafter, in order to explain this invention in greater detail, the preferred embodiments of the present invention will be described with reference to the accompanying drawings.

Embodiment 1

Figure 1:
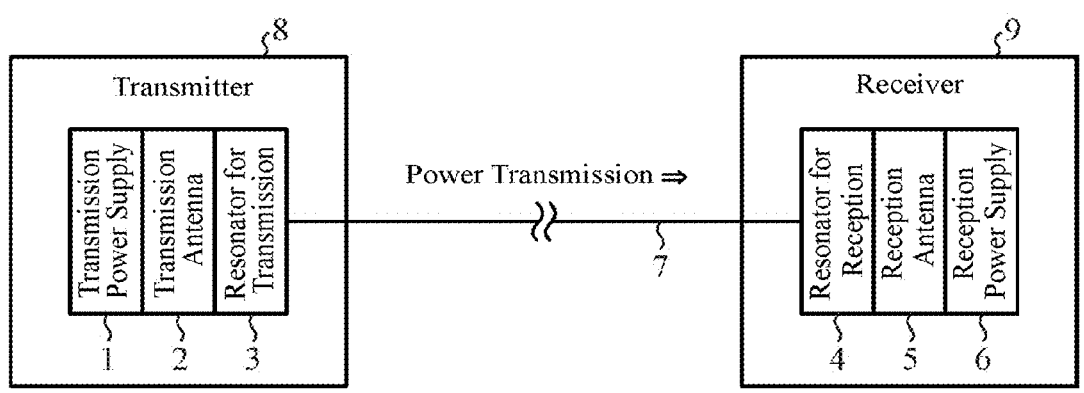
FIG. 1 is a block diagram showing the configuration of a resonance type power transmission device according to Embodiment 1 of the present invention.
Figure 2:
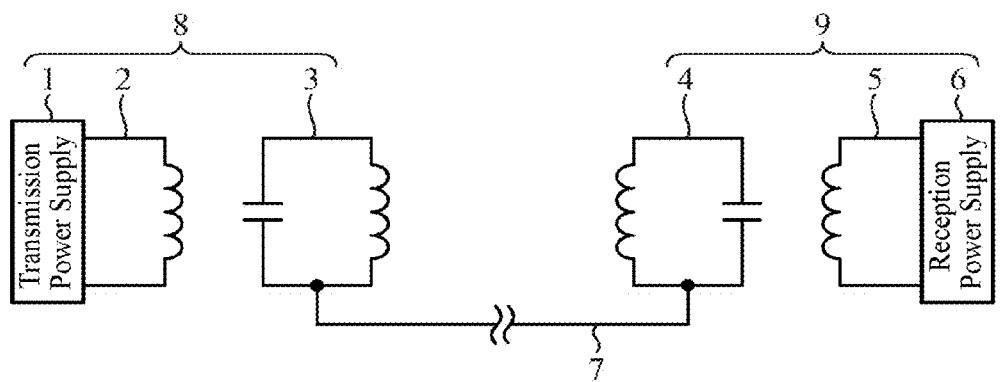
FIG. 2 is a circuit diagram showing the configuration of the resonance type power transmission device in accordance with Embodiment 1 of the present invention.
Figure 2:
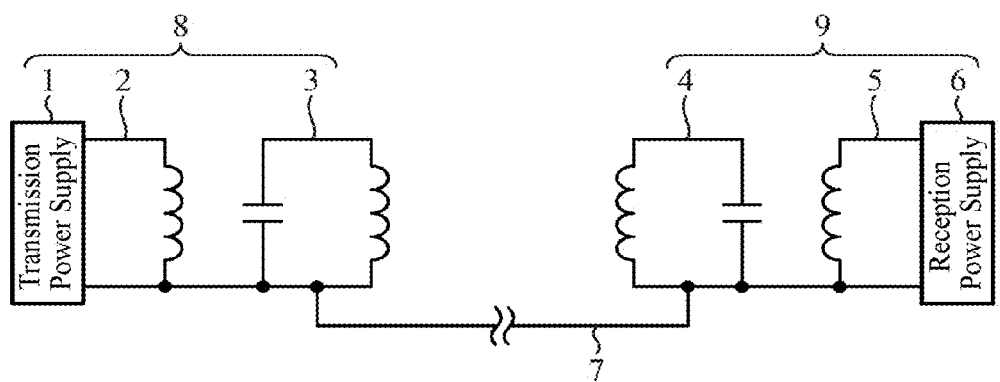
Figure 2:
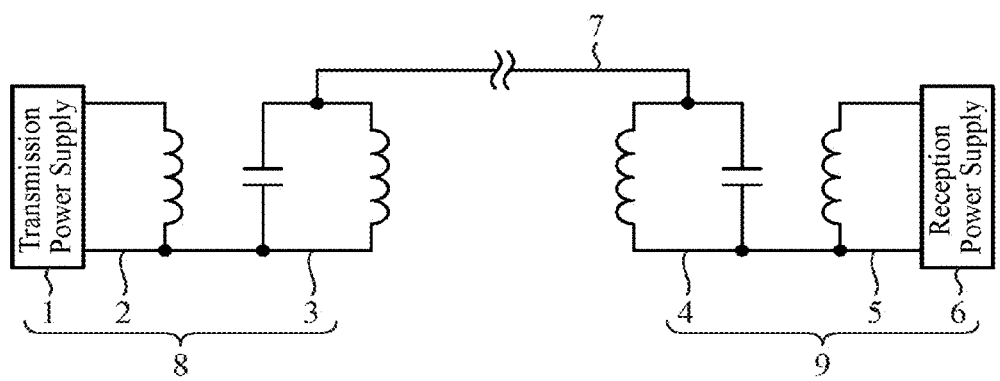

FIG. 1 is a block diagram showing the configuration of a resonance type power transmission device in accordance with Embodiment 1 of the present invention, and FIG. 2 is a circuit diagram of the resonance type power transmission device.

The resonance type power transmission device transmits electric power including an electric signal. This resonance type power transmission device is configured with a transmission power supply 1, a transmission antenna 2, a resonator 3 for transmission, a resonator 4 for reception, a reception antenna 5, a reception power supply 6, and a conductive substance 7, as shown in FIG. 1. Referring to FIG. 1, the transmission power supply 1, the transmission antenna 2, and the resonator 3 for transmission construct a transmitter 8, and the resonator 4 for reception, the reception antenna 5, and the reception power supply 6 construct a receiver 9.

The transmission power supply 1 supplies electric power having a single frequency to the transmission antenna 2.

The transmission antenna 2 transmits the electric power supplied thereto from the transmission power supply 1 to the reception antenna 5 via the resonator 3 for transmission and the resonator 4 for reception.

The resonator 3 for transmission and the resonator 4 for reception resonate with each other with the resonators being tuned to a predetermined resonance condition. The set of the transmission antenna 2 and the resonator 3 for transmission, and the set of the reception antenna 5 and the resonator 4 for reception can be grounded independently, as shown in FIGS. 2(b) and 2(c).

Figure 3:
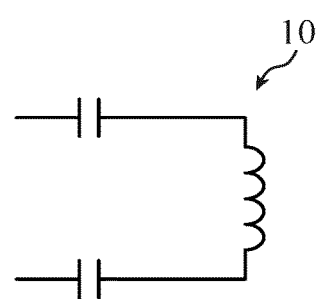
FIG. 3 is a circuit diagram showing the configuration of a resonator doubling as antenna in accordance with Embodiment 1 of the present invention.
Figure 3:
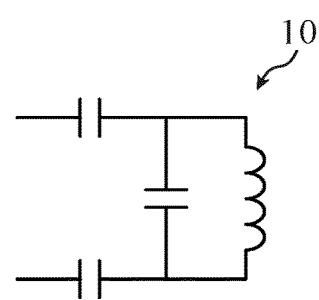
Figure 3:
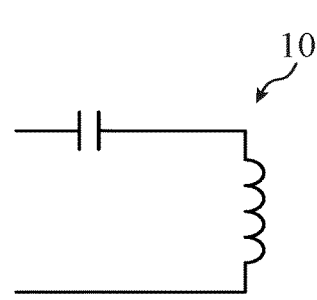
Figure 3:
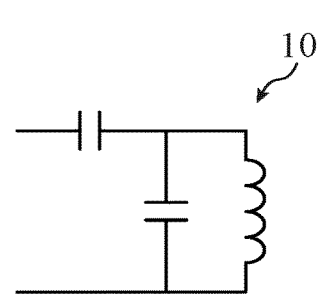
Figure 4:
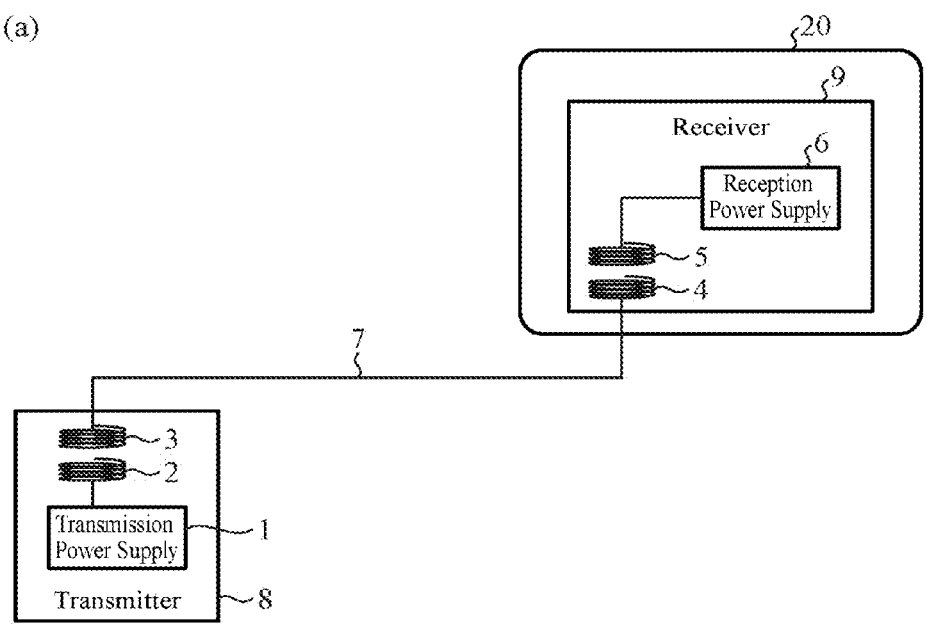
FIG. 4 is a diagram showing an example of application of the resonance type power transmission device in accordance with Embodiment 1 of the present invention.
Figure 4:
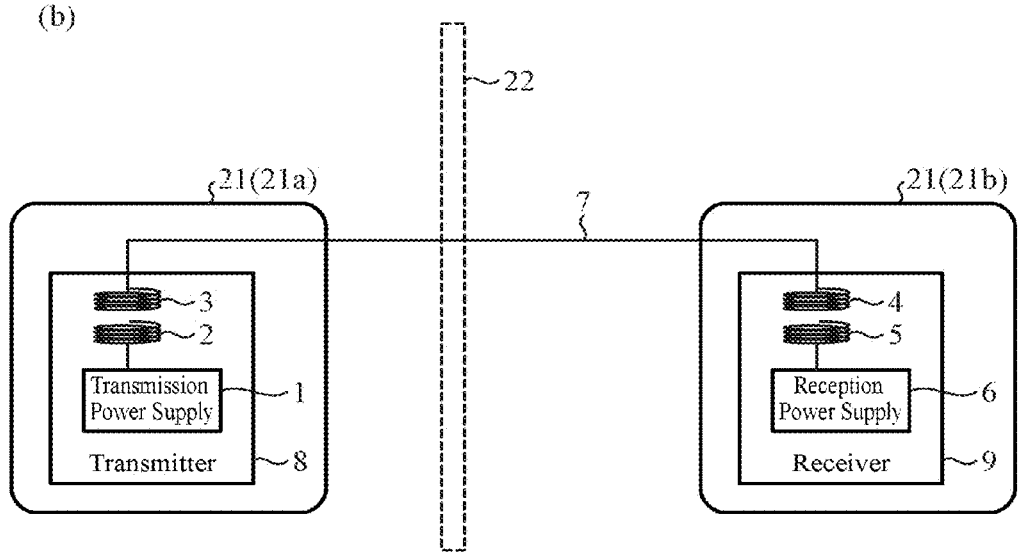
Figure 5:
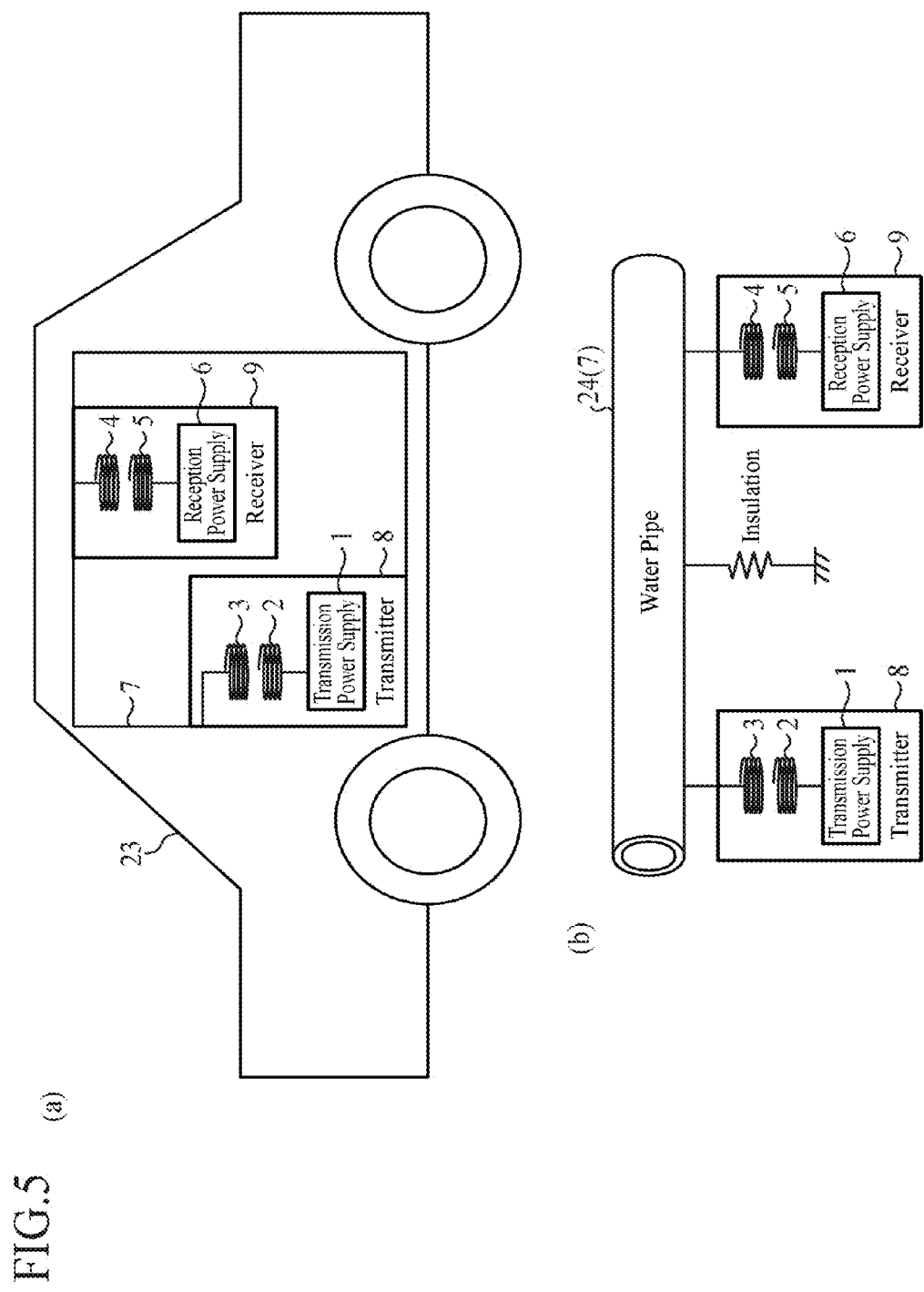
FIG. 5 is a diagram showing another example of application of the resonance type power transmission device in accordance with Embodiment 1 of the present invention.

Further, although the example in which the transmission antenna 2 and the resonator 3 for transmission are configured separately and the reception antenna 5 and the resonator 4 for reception are configured separately is shown in FIGS. 1 and 2, a resonator doubling as antenna 10 configured integrally can be used as each of those sets, as shown in FIG. 3, for example.

The reception antenna 5 receives the electric power from the transmission antenna 2 via the resonator 3 for transmission and the resonator 4 for reception.

The reception power supply 6 supplies the electric power received by the reception antenna 5 to load equipment (not shown) or the like.

A transmission method which the resonator 3 for transmission and the resonator 4 for reception use is not limited particularly, and can be any of a method according to magnetic-field resonance, a method according to electric-field resonance, and a method according to electromagnetic induction.

The conductive substance 7 establishes an electrical single point connection between the resonator 3 for transmission and the resonator 4 for reception. The "electrical single point connection" mentioned hereafter is referred to as a connection in which the resonator 3 for transmission and the resonator 4 for reception are connected to each other at a single point from the viewpoint of a circuit diagram, as shown in FIG. 2. This conductive substance 7 can have any kind of shape, such as a linear shape or a planar shape. FIGS. 2(a) and 2(b) show examples in which the conductive substance 7 shaped like a line is connected between the return sides of the resonators 3 and 4, and FIG. 2(c) shows an example in which the conductive substance 7 shaped like a line is connected between the hot sides of the resonators 3 and 4. Further, the conductive substance 7 has only to be able to establish an electrical single point connection between the resonators 3 and 4, and the electrical single point connection is not limited to the connection examples shown in FIG. 2. For example, the conductive substance can slantwise connect between the resonators 3 and 4.

By thus establishing an electrical single point connection between the resonators 3 and 4 whose resonance conditions are matched to each other by using the conductive substance 7, the electric oscillation energy caused by the resonance of the resonator 3 for transmission can be sent to the resonator 4 for reception via the conductive substance 7, and that electric oscillation energy can be amplified by the resonance in the resonator 4 for reception. As a result, the electric power can be transmitted from the transmitter 8 to the receiver 9 with a high degree of efficiency.

Next, examples of application of the resonance type power transmission device in accordance with the present invention will be explained with reference to FIGS. 4 to 7.

FIG. 4(a) shows an example of using a metallic rope or the like as the conductive substance 7 in accordance with the present invention. In this example, the transmitter 8 is connected to an end of the rope, and the receiver 9 is disposed in a car (an elevator, a cable car, a ropeway, or the like) 20 connected to that rope. As a result, the resonance type power transmission device can supply electric power to the car 20 via the existing rope or the like.

Further, FIG. 4(b) shows an example of applying the present invention to the transmission of power between electromagnetic wave shielding rooms 21. In a case in which there are enclosures, such as electromagnetic wave shielding rooms 21, each of which blocks an electric field and a magnetic field, electric power cannot be transmitted between the enclosures by simply using a conventional method. However, according to the method in accordance with the present invention, by establishing an electrical single point connection between the transmitter 8 installed in one electromagnetic wave shielding room 21a and the receiver 9 installed in another electromagnetic wave shielding room 21b by using the conductive substance 7, the resonance type power transmission device can easily transmit electric power. Further, even in a case in which a protective barrier 22 or the like which blocks an electric field and a magnetic field is placed between the transmitter 8 and the receiver 9, the resonance type power transmission device can similarly carry out power transmission.

Further, FIG. 5(a) shows an example of applying the present invention to a moving object (an automobile, a motorbike, a bicycle, or the like) 23 equipped with a space insulated from the ground. In this example, the transmitter 8 and the receiver 9 are disposed in the above-mentioned space. In a case in which the above-mentioned space consists of a conductive material, this conductive material can be used as the conductive substance 7 in accordance with the present invention, and, by simply connecting the transmitter 8 and the receiver 9 to the above-mentioned space by using bolts or the likes, the resonance type power transmission device can transmit electric power. Therefore, while the wiring work becomes unnecessary, the flexibility of installation of the devices 8 and 9 is improved.

Further, FIG. 5(b) shows an example of using an existing conductive water pipe 24 as the conductive substance 7 in accordance with the present invention. In this example, the water pipe 24 needs to be insulated from the ground (GND). As a result, the wiring work for power transmission becomes unnecessary.

Figure 6:
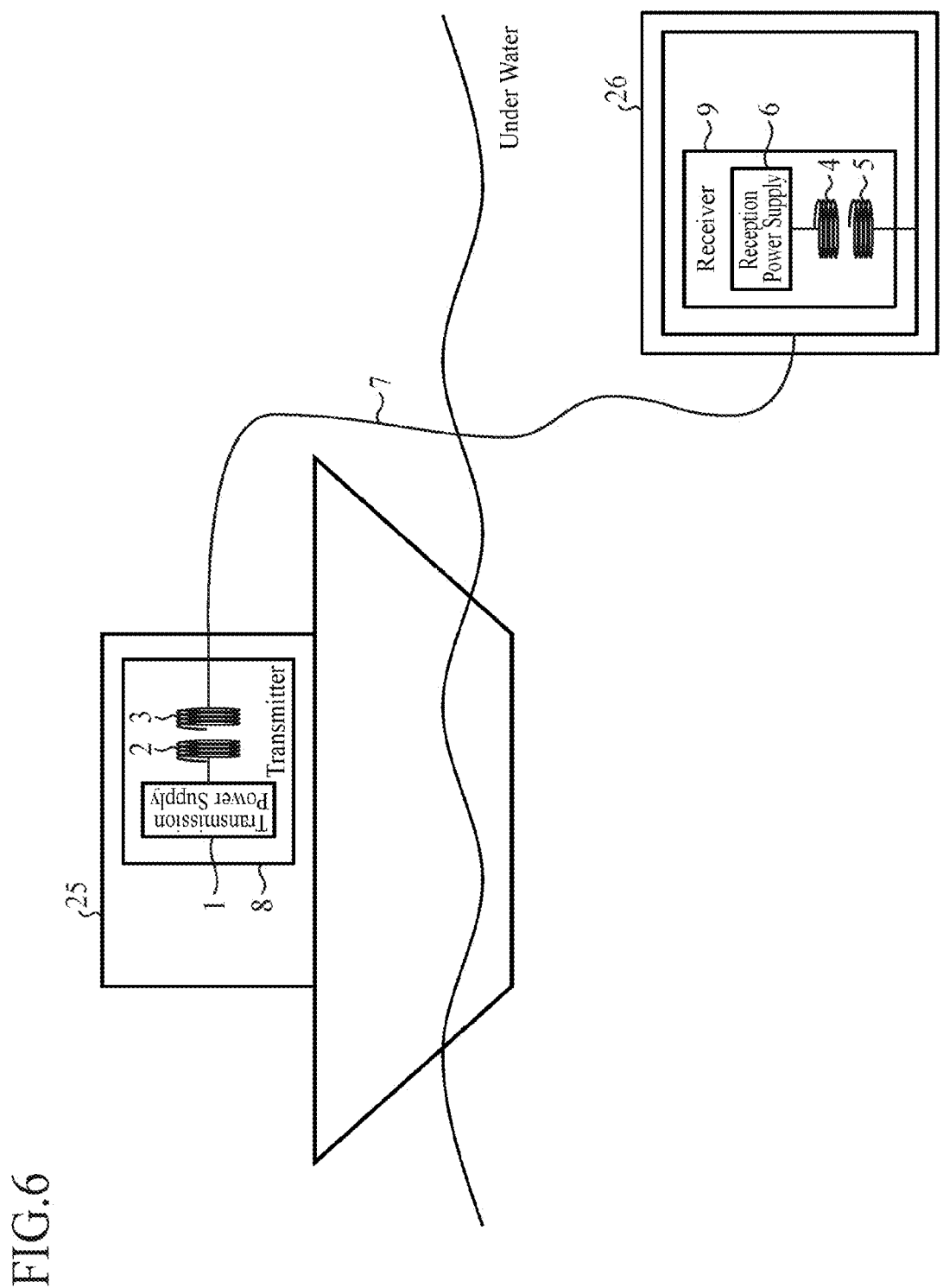
FIG. 6 is a diagram showing another example of application of the resonance type power transmission device in accordance with Embodiment 1 of the present invention.
Figure 7:
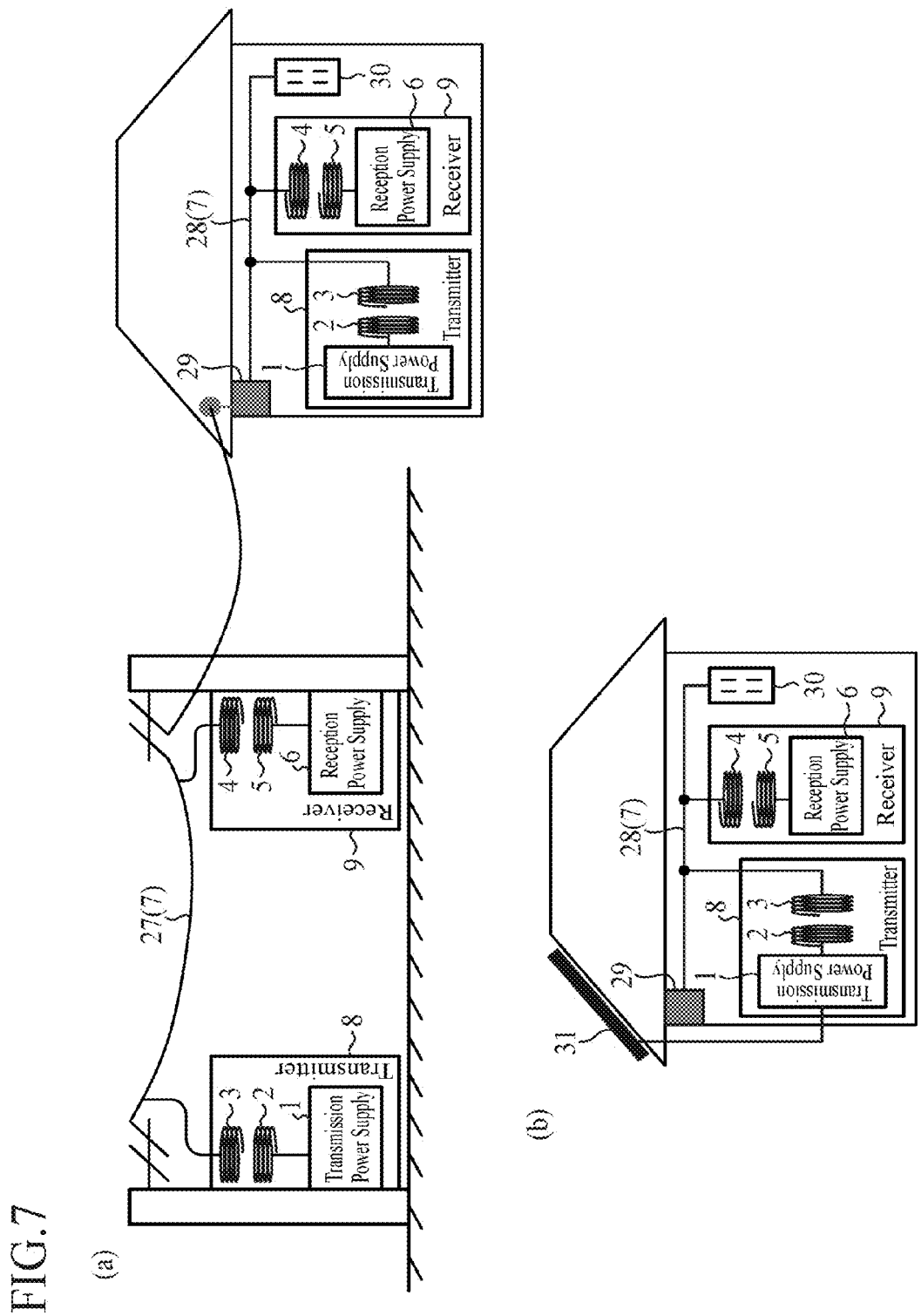
FIG. 7 is a diagram showing another example of application of the resonance type power transmission device in accordance with Embodiment 1 of the present invention.

Further, FIG. 6 shows an example of applying the present invention to a supply of electric power from a ship 25 to an underwater device (an underwater vehicle or the like) 26. In this example, the transmitter 8 is disposed in the ship 25, and the receiver 9 is disposed in the underwater device 26. An existing metallic wire or the like should just be used as the conductive substance 7.

Further, a left-hand side of FIG. 7(a) shows an example of using an existing electric wire 27 as the conductive substance 7 in accordance with the present invention, and a right-hand side of the figure shows an example of using an indoor existing wire 28 as the conductive substance 7 in accordance with the present invention. Reference numerals 29 and 30 denote a breaker and an electrical outlet, respectively. As a result, other electric power of high frequency, which is different from electric power of commercial frequency which is originally flowing through the electric wire 27 and the wire 28, can be transmitted. As shown in FIG. 7(b), as the electric power for the transmission power supply 1, electric power generated by a solar generator 31 disposed outdoors can be used.

As mentioned above, because the resonance type power transmission device in accordance with this Embodiment 1, which transmits electric power by using the resonator 3 for transmission and the resonator 4 for reception whose resonance conditions are matched to each other, includes the transmission power supply 1 to supply electric power, the transmission antenna 2 to transmit the electric power from the transmission power supply 1, the conductive substance 7 to establish an electrical single point connection between the resonator for transmission 3 and the resonator for reception 4, the reception antenna 5 to receive the electric power from the transmission antenna 2 via the resonator for transmission 3 and the resonator for reception 4, and the reception power supply 6 to receive the electric power received by the reception antenna 5, the resonance type power transmission device can be produced at a low cost and downsized because of its simple configuration, and makes it possible to carryout efficient power transmission over a range from a short distance to a long distance.

Further, the direct resonant coupling of a space magnetic flux, which appears in a conventional system, among the transmission antenna 2, the resonator 3 for transmission, the resonator 4 for reception, and the reception antenna 5 is not needed, and the transmission distance and the direction can be set arbitrarily.

Embodiment 2

Figure 8:
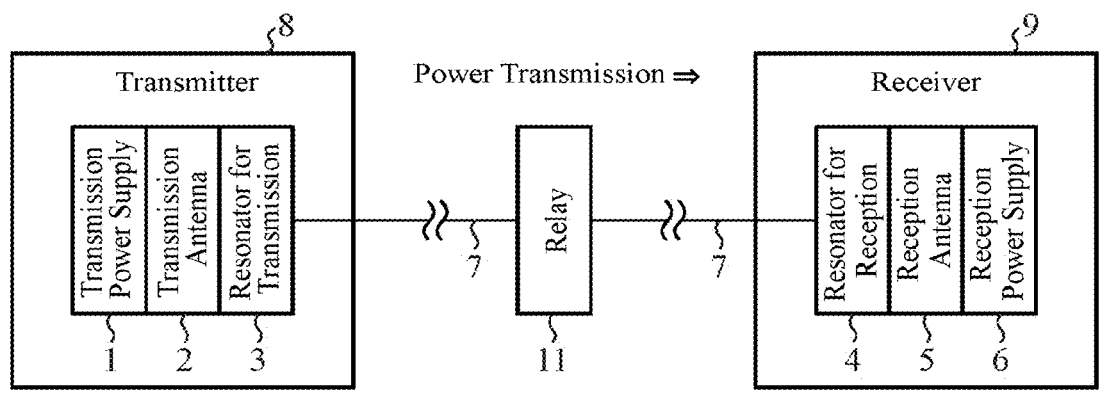
FIG. 8 is a block diagram showing the configuration of a resonance type power transmission device according to Embodiment 2 of the present invention.

FIG. 8 is a block diagram showing the configuration of a resonance type power transmission device in accordance with Embodiment 2 of the present invention. The resonance type power transmission device in accordance with Embodiment 2 shown in this FIG. 8 includes a relay 11 in addition to the components of the resonance type power transmission device in accordance with Embodiment 1 shown in FIG. 1. The other components are the same as those of Embodiment 1, and are designated by the same reference numerals and the explanation of the components will be omitted hereafter.

Figure 9:
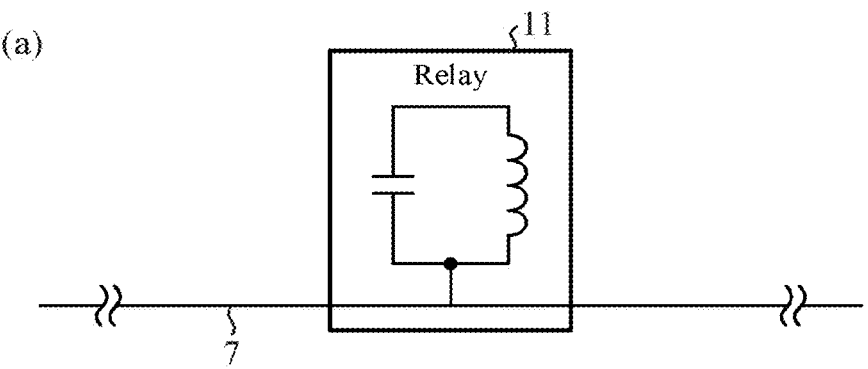
FIG. 9 is a circuit diagram showing the configuration of a relay in accordance with Embodiment 2 of the present invention.
Figure 9:
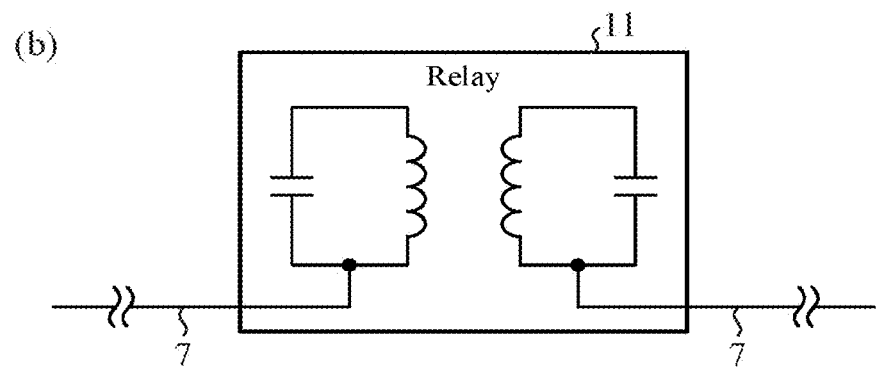
Figure 9:
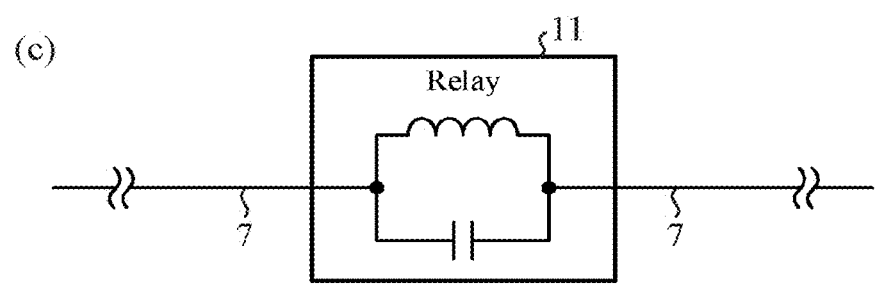
Figure 9:
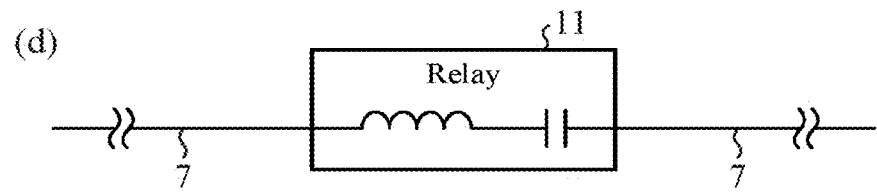
Figure 9:
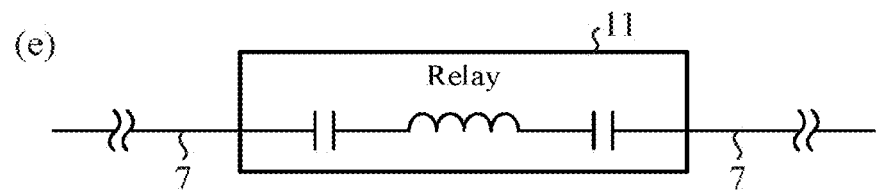

The relay 11 is a resonator for relay which is disposed between a resonator 3 for transmission and a resonator 4 for reception, and whose resonance condition is matched to the resonance conditions of the resonator 3 for transmission and the resonator 4 for reception. As that relay 11, examples shown in, for example, FIG. 9 are provided. FIG. 9(a) shows an example in which an electrical single point connection is established with that resonator, FIG. 9(b) shows an example in which a wireless connection is established between the transmit side resonator and the receive side resonator, and FIGS. 9(c) to 9(e) shows examples in each of which the impedances of connected conductive substances 7 are used.

By using the relay 11, electric power from the resonator 3 for transmission can be temporarily received and amplified by the relay 11 and sent to the resonator 4 for reception, and the transmission efficiency can be improved.

As mentioned above, because the resonance type power transmission device in accordance with this Embodiment 2 includes the relay 11 which is disposed between the resonator 3 for transmission and the resonator 4 for reception, and whose resonance condition is matched to those of the resonators, the transmission efficiency can be further improved as compared with the configuration shown in Embodiment 1.

Embodiment 3

Figure 10:
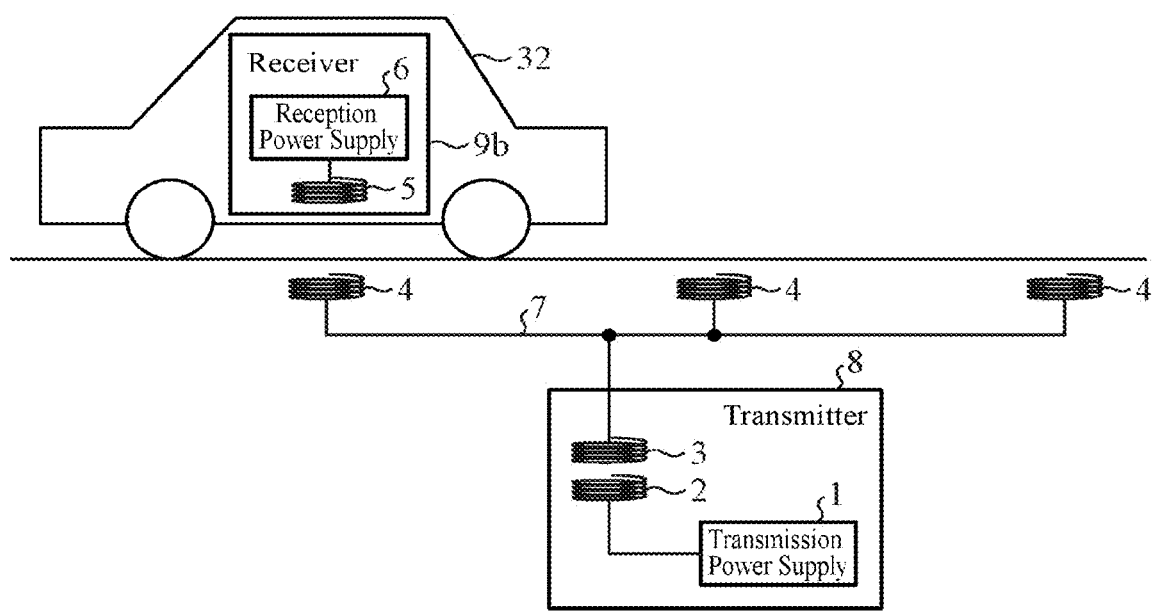
FIG. 10 is a diagram showing the configuration and an example of application of a resonance type power transmission device in accordance with Embodiment 3 of the present invention.

FIG. 10 is a diagram showing the configuration and an example of application of a resonance type power transmission device in accordance with Embodiment 3 of the present invention. The resonance type power transmission device in accordance with Embodiment 3 shown in this FIG. 10 includes a plurality of resonators 4 for reception in the configuration of the resonance type power transmission device in accordance with Embodiment 1 shown in FIG. 1, and is configured in such a way that a resonator 3 for transmission is connected to each of the plurality of resonators 4 for reception via a conductive substance 7. Further, referring to FIG. 10, the resonance type power transmission device includes a receiver 9b configured with a reception antenna 5 and a reception power supply 6, instead of the receiver 9, and the receiver 9b is disposed as a unit separate from the resonators 4 for reception. The other components are the same as those of Embodiment 1, and they are designed by the same reference numerals and the explanation of the components will be omitted hereafter.

FIG. 10 shows an example of applying the present invention to a supply of electric power to a vehicle 32 parked in a parking area. In this example, the plurality of resonators 4 for reception are disposed under the ground surface of each parking area. As a result, when a vehicle 32 equipped with the receiver 9b is parked in the above-mentioned parking area, the resonance type power transmission device can supply electric power to that vehicle 32.

Figure 11:
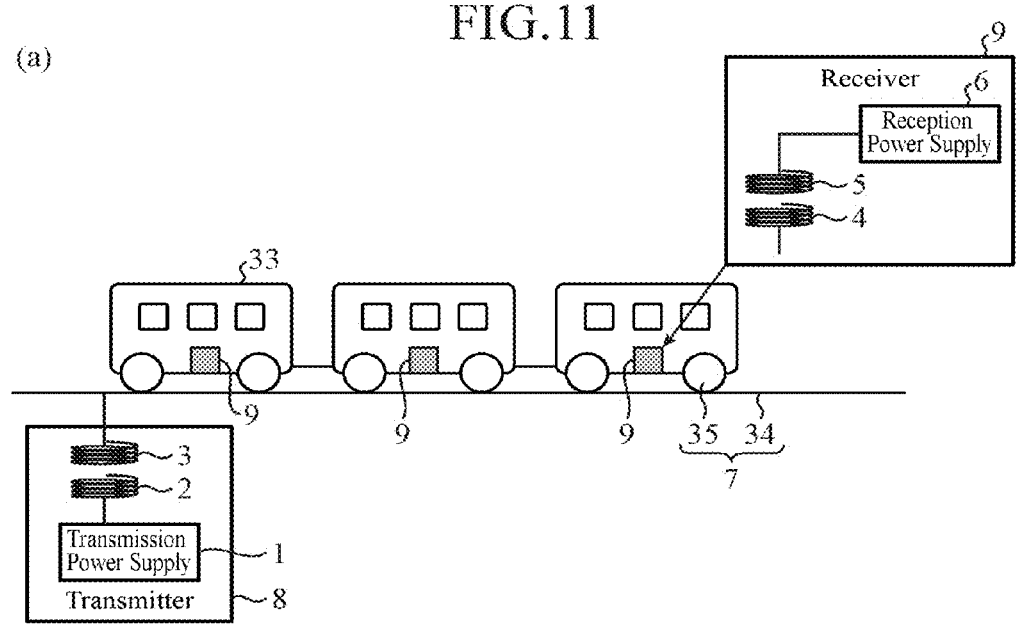
FIG. 11 is a diagram showing another example of application of the resonance type power transmission device in accordance with Embodiment 3 of the present invention.
Figure 11:
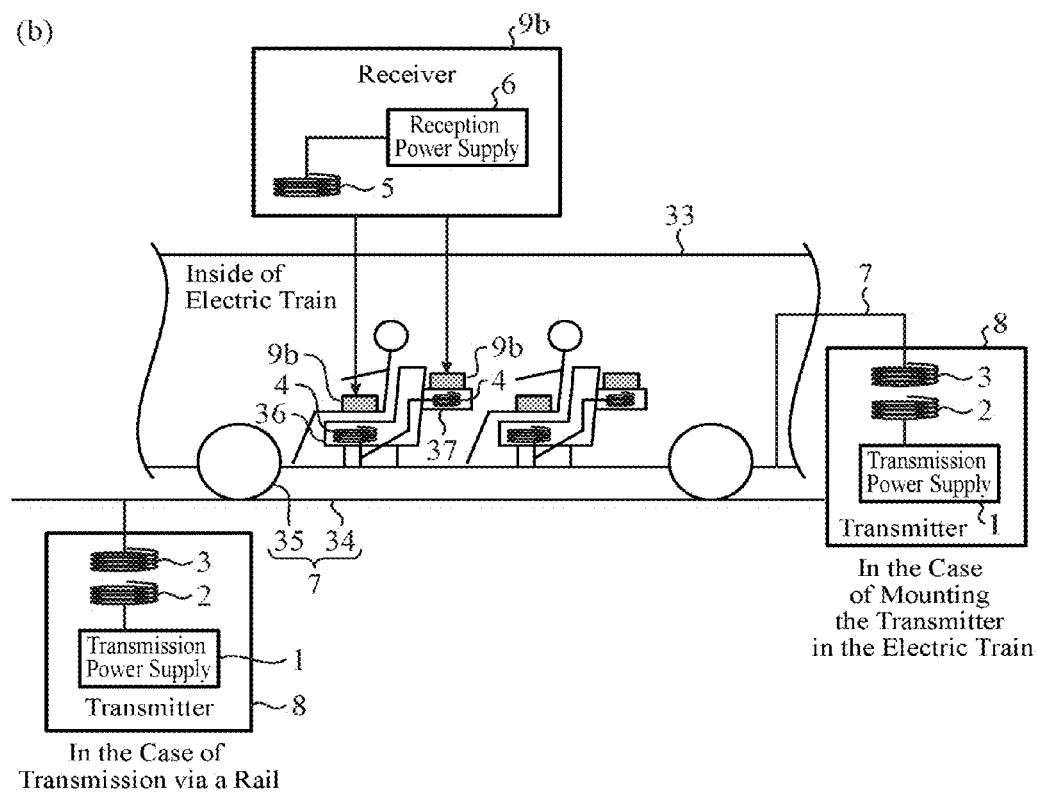

Further, FIG. 11(a) shows an example of applying the present invention to a supply of electric power to an electric train 33. In this example, a rail 34 and the wheels 35 of the electric train 33 are used as the conductive substance 7, and electric power is supplied from the transmitter 8 connected to the rail 34 to the receiver 9 disposed in each car. It is necessary to place the rail 34 in a state which the rail is not grounded and is floating in electric potential. Although conventionally, the use of pantographs for power transmission is difficult in rapid transit railways, the application of the present invention makes it possible to perform power transmission without using pantographs.

Further, FIG. 11(b) shows an example of applying the present invention to another supply of electric power to an electric train 33. In the example of FIG. 11(b), a resonator 4 for reception is disposed either under each seat 36 in the electric train or in each table 37 for use in a rear seat in the electric train. As a result, when a user simply sits down with equipment (a smart phone, a PC, a mobile router, or the like) equipped with the receiver 9b, or simply places such equipment on a table 37, the resonance type power transmission device can supply electric power to that equipment. Therefore, when charging such equipment, the user does not have to connect the equipment to an electrical outlet, and therefore the convenience is improved. The transmitter 8 is not necessarily disposed outside the electric train 33, and can be disposed in the electric train.

Figure 12:
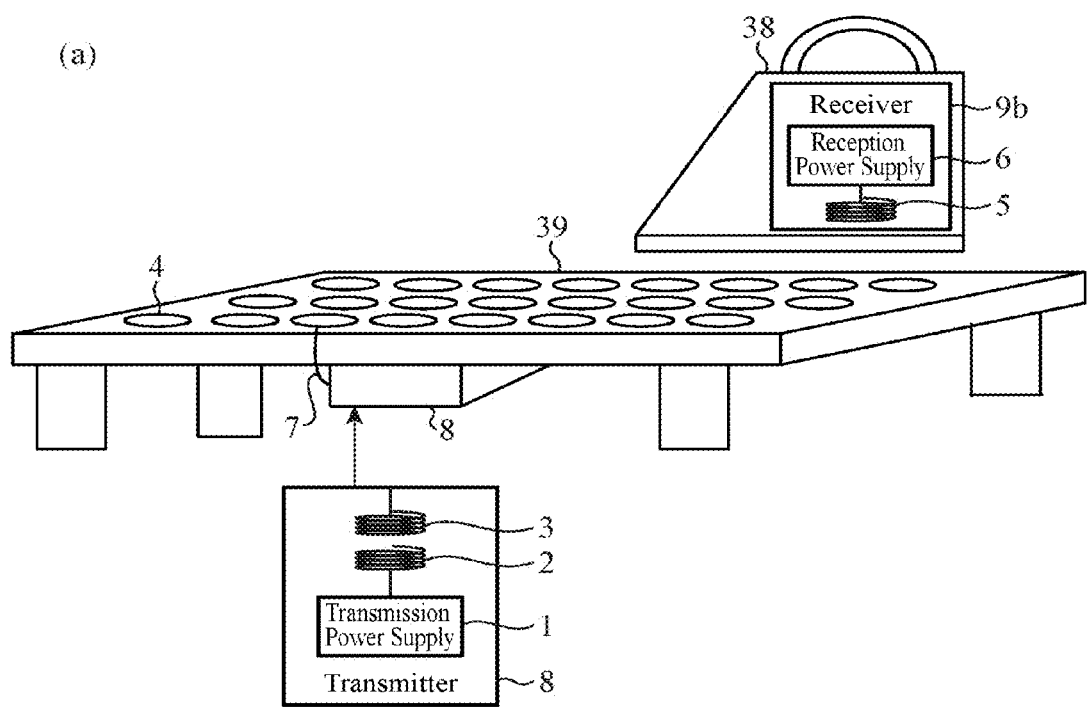
FIG. 12 is a diagram showing another example of application of the resonance type power transmission device in accordance with Embodiment 3 of the present invention.
Figure 12:
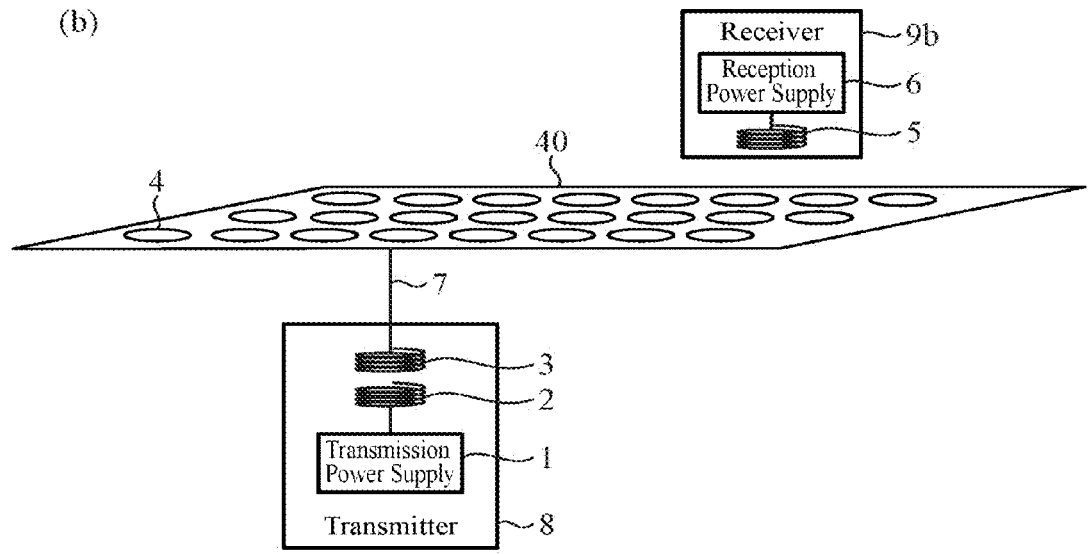

Further, FIG. 12(a) shows an example of applying the present invention to a supply of electric power to a cordless iron 38. In this example, the plurality of resonators 4 for reception are disposed inside an ironing board 39 in a planar form. As a result, while a user is doing the ironing by using the cordless iron 38 equipped with the receiver 9b, the resonance type power transmission device can supply electric power to that cordless iron 3, so that the cordless iron can be made to operate continuously without its temperature being dropped.

Figure 13:
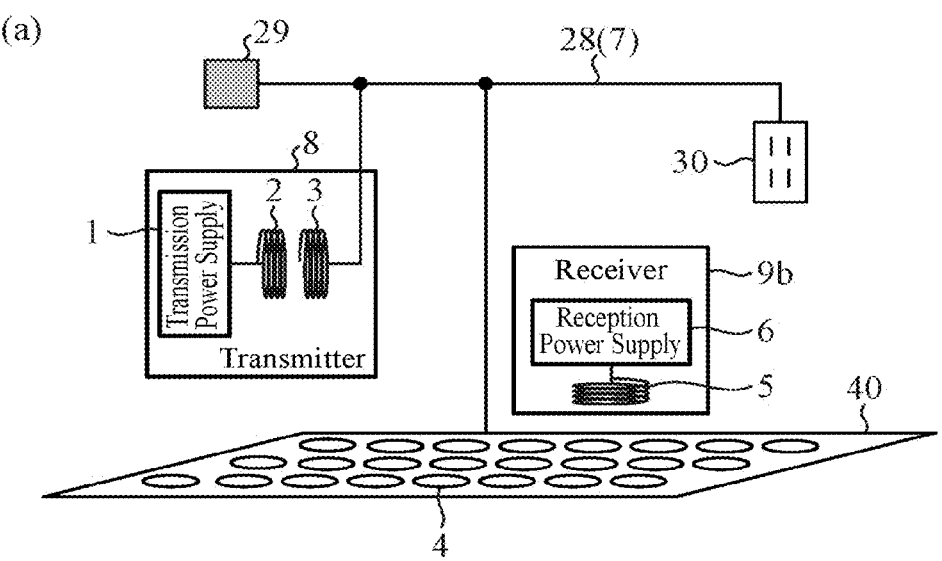
FIG. 13 is a diagram showing another example of application of the resonance type power transmission device in accordance with Embodiment 3 of the present invention.
Figure 13:
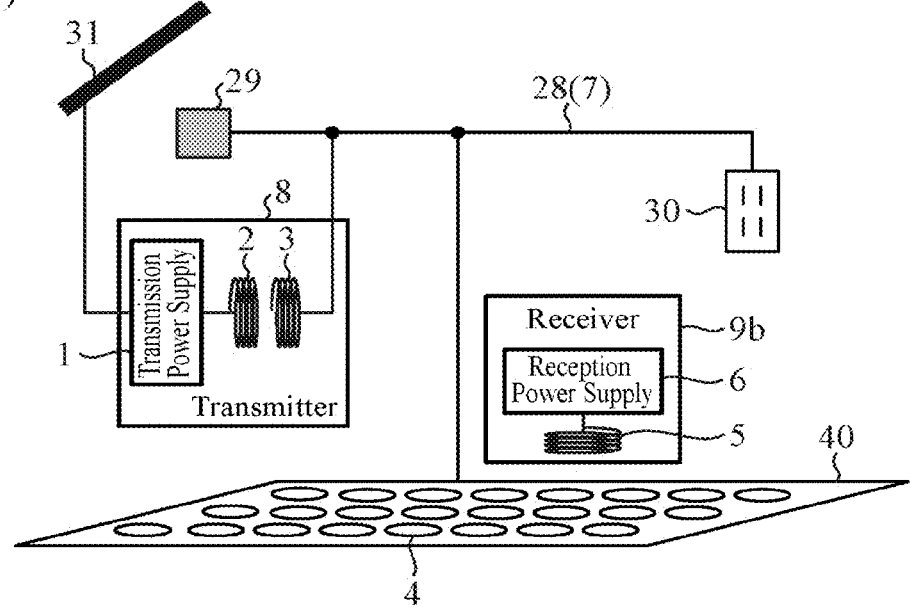
Figure 14:
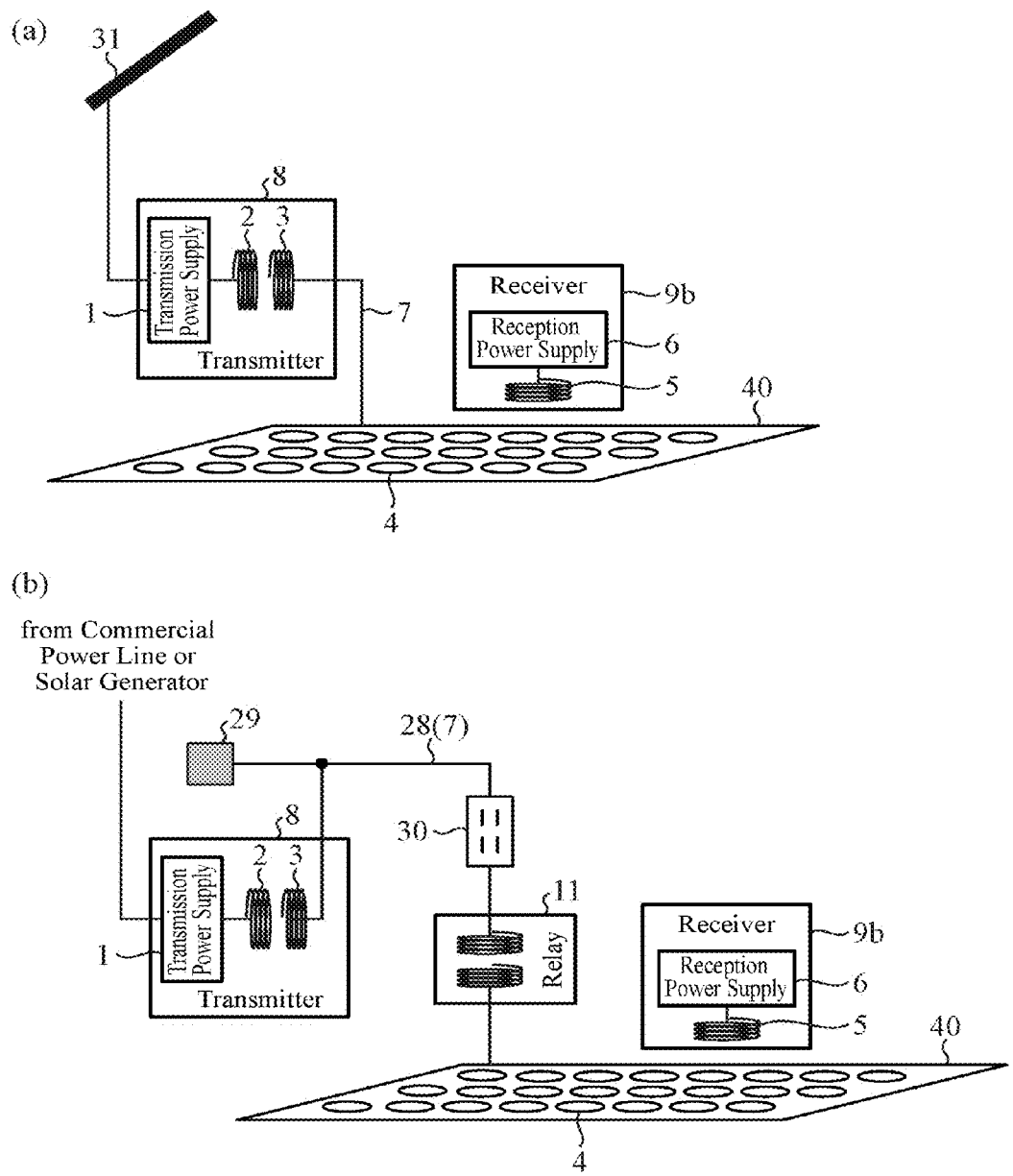
FIG. 14 is a diagram showing another example of application of the resonance type power transmission device in accordance with Embodiment 3 of the present invention.

Further, FIG. 12(b) shows an example of applying the present invention to a sheet member (a tablecloth, a mat, a carpet, or the like) 40. In this example, the plurality of resonators 4 for reception are disposed inside the sheet member 40 in a planar form. As a result, when equipment (a cleaner or the like) equipped with the receiver 9b is placed on the sheet member 40, the resonance type power transmission device can supply electric power to that equipment. As shown in FIG. 13(a), the above-mentioned sheet member 40 can be used for a system in which an existing wiring 28 (or an existing electric wire 27) is used as the conductive substance 7 in accordance with the present invention. FIGS. 13(b) and 14(a) further show examples in which electric power generated by a solar generator disposed outdoors is used as electric power for a transmission power supply 1. Further, FIG. 14(b) shows an example in which the conductive substance 7 is connected to the sheet member via one pole of an electrical outlet 30. Although a relay 11 is used in the example of FIG. 14(b), it is not necessary to use the relay.

Figure 15:
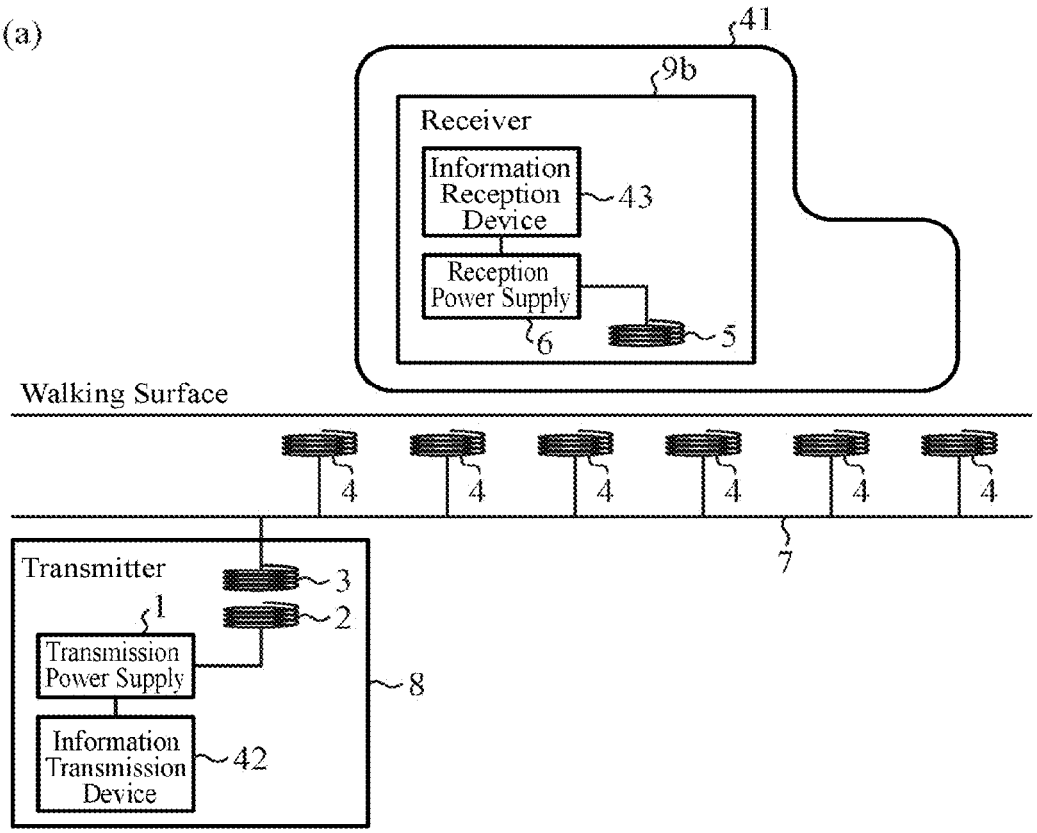
FIG. 15 is a diagram showing another example of application of the resonance type power transmission device in accordance with Embodiment 3 of the present invention.
Figure 15:
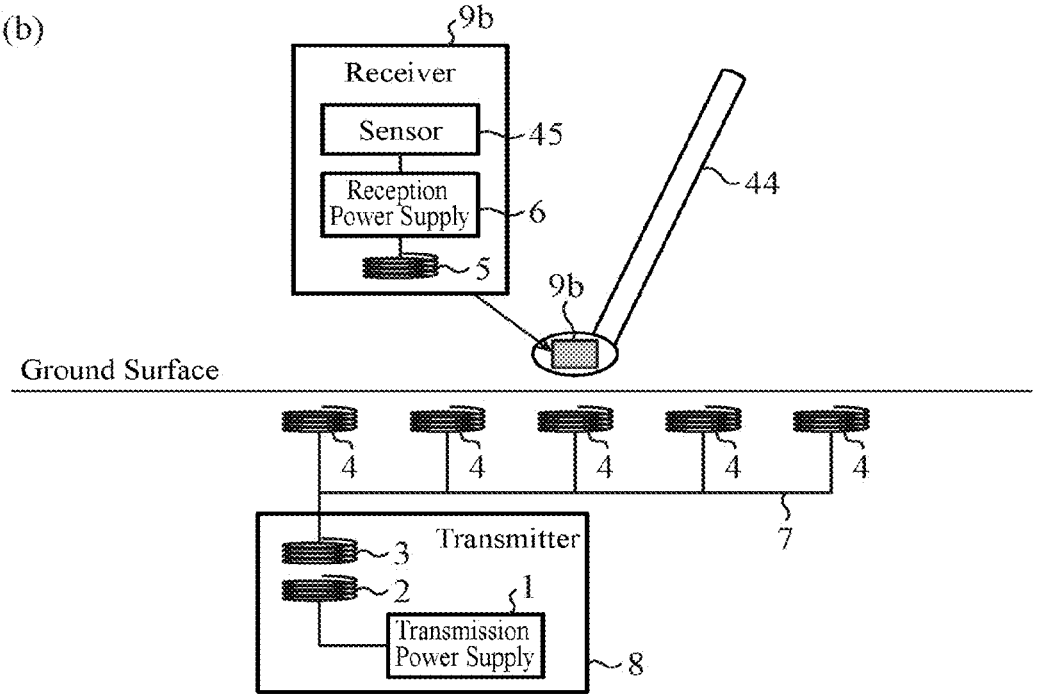

Further, FIG. 15(a) shows an example of applying the present invention to a supply of electric power to a walking robot 41. In this example, the plurality of resonators 4 for reception are disposed under a walking surface (a ground surface, a floor, or the like) in a planar form, and the receiver 9b is disposed in a foot portion of the walking robot 41. As a result, while the walking robot 41 is walking on the walking surface, the resonance type power transmission device can supply electric power to that walking robot 41. Further, by installing an information transmission device 42 in the transmitter 8, and also installing an information reception device 43 in the receiver 9b, not only power transmission is carried out, but also transmission of information about the walk (the walking position, the direction, and so on) can be carried out. Further, this example can be applied not only to the walking robot 41 but also to shoes, a stick, a cleaner, and so on. When the present invention is applied to shoes, an application intended for, for example, visually impaired persons can be provided. More specifically, by connecting a vibrator to the receiver 9b and disposing a resonator 4 for reception in each portion where conventional Braille for the feet is disposed heretofore, instead of Braille for the feet, when those shoes are located on the resonator 4 for reception, Braille for the feet can be imitated by a vibration of the vibrator.

Further, FIG. 15(b) shows an example of applying the present invention to a supply of electric power to a sensor 45 to measure the acceleration, the pressure, the angle, and so on of a swing of a golf club 44. In this example, the plurality of resonators 4 for reception are disposed under a ground surface in a planar form, and the receiver 9b having the sensor 45 is disposed in a head portion of the golf club 44. As a result, when the golf club 44 is brought close to the ground surface, the resonance type power transmission device can supply electric power to the sensor 45 of that golf club 44. As a result, it becomes unnecessary to install a battery for operating the sensor 45 in the golf club 44, and a weight reduction in the golf club 44 can be established. Further, the example can be applied not only to the golf club 44 but also to a tennis or table tennis racket, a bat, a fishing rod, mobile equipment, and so on.

Figure 16:
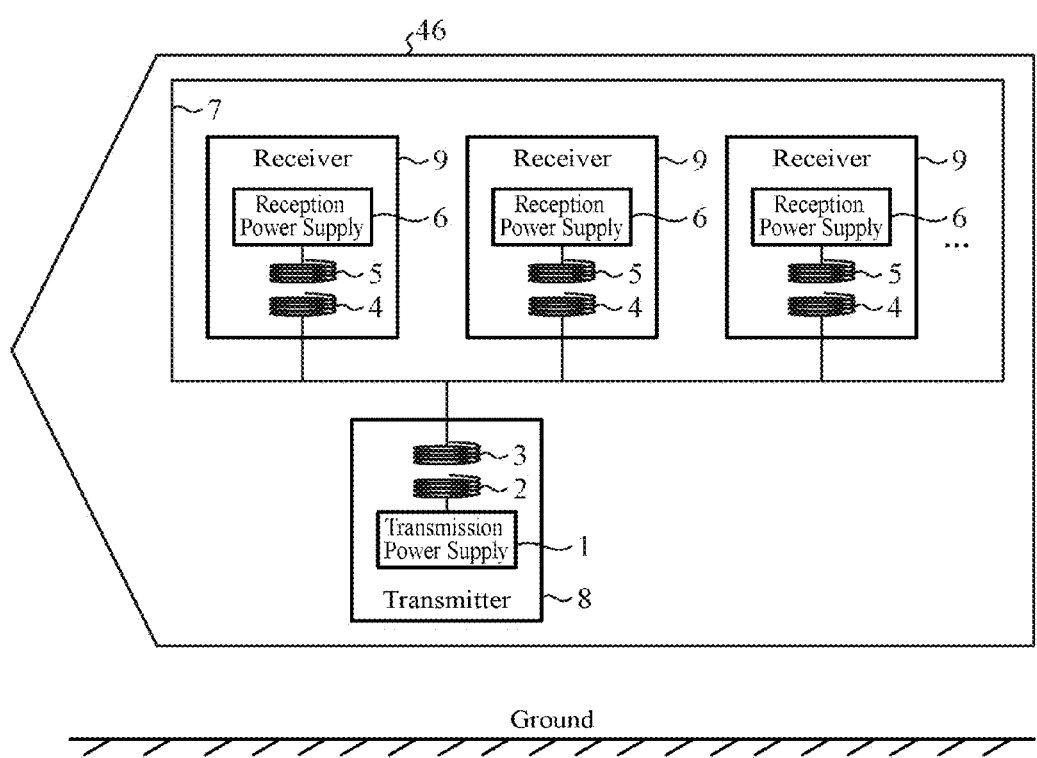
FIG. 16 is a diagram showing another example of application of the resonance type power transmission device in accordance with Embodiment 3 of the present invention.

Further, FIG. 16 shows an example of applying the present invention to a flying object (an airplane, a helicopter, a balloon, a missile, an artificial satellite, a space station, a linear motor car, or the like) 46. In a case in which a space in the flying object 46 consists of a conductive material, this space can be used as the conductive substance 7 in accordance with the present invention, by simply connecting the above-mentioned transmitter 8 and the receivers 9 to the above-mentioned space by using bolts or the likes, the resonance type power transmission device can transmit electric power. Therefore, while the wiring work becomes unnecessary, the flexibility of installation of the devices 8 and 9 is improved.

Figure 17:
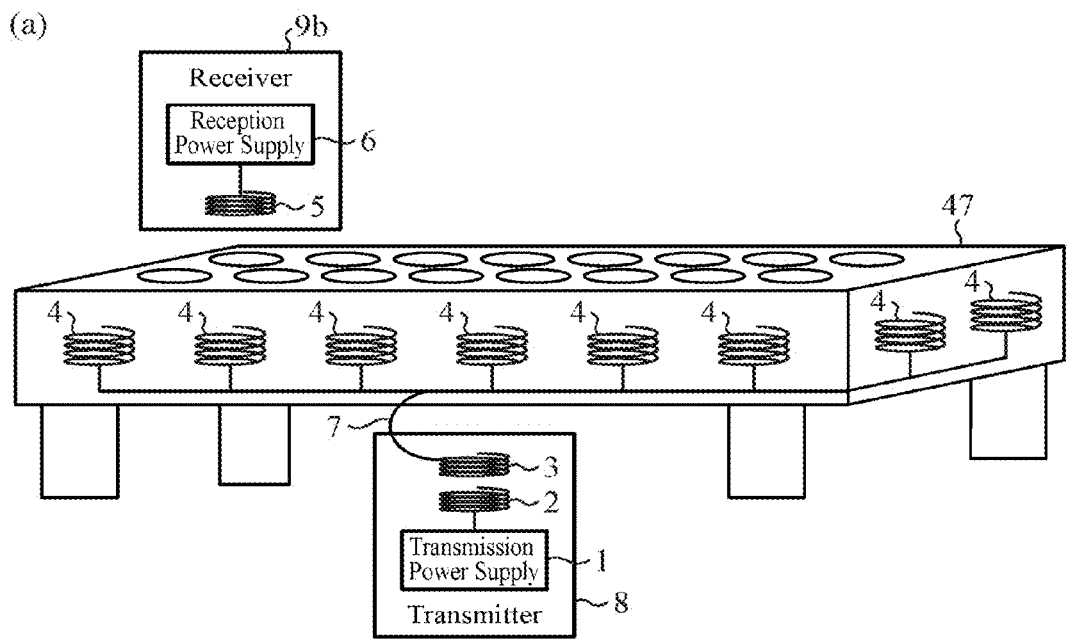
FIG. 17 is a diagram showing another example of application of the resonance type power transmission device in accordance with Embodiment 3 of the present invention.
Figure 17:
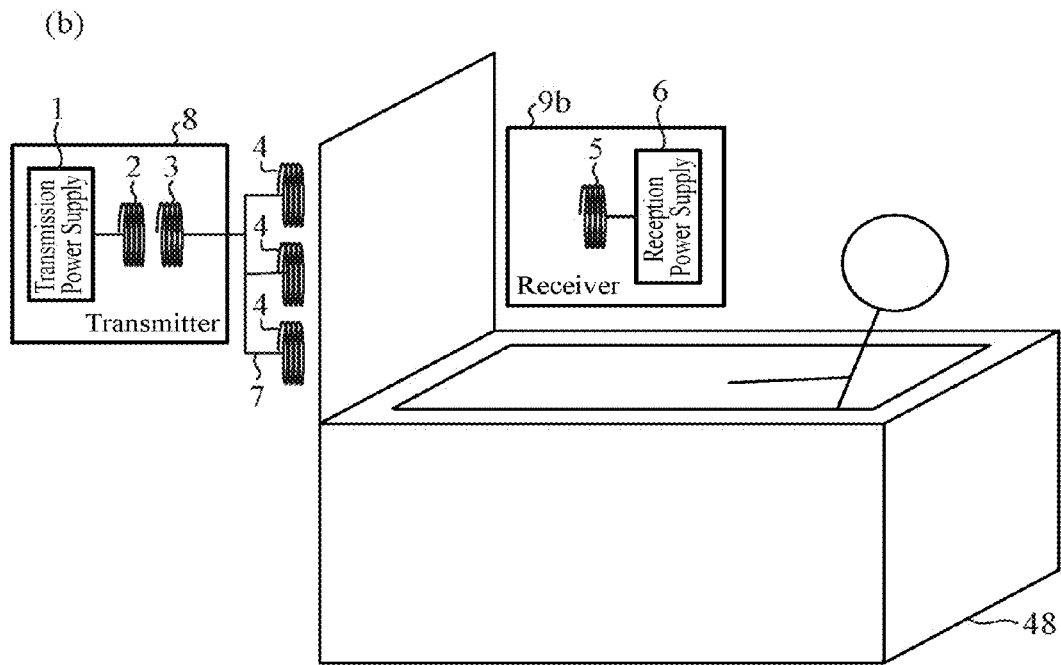

Further, FIG. 17(*a*) shows an example of applying the present invention to a bed 47. In this example, the plurality of resonators 4 for reception are disposed inside the bed 47 in a planar form. As a result, by simply placing equipment equipped with the receiver 9*b* on the bed 47, the resonance type power transmission device can supply electric power to that equipment. A resonator that also serves as the spring function of the bed 47 can be used as each of the resonators 4 for reception.

Further, FIG. 17(*b*) shows an example of applying the present invention to a bath 48. In this case, the plurality of resonators 4 for reception are disposed, in a planar form, in a portion on a rear side of a wall surface of the bath 48. As a result, by simply bringing equipment (a TV, a radio, a smart phone, an electric shaver, a glass cleaner, a jet bubble device, or the like) equipped with the receiver 9*b* close to that wall surface, the resonance type power transmission device can supply electric power to that equipment. In the present invention, because the transmit side and the receive side are connected to each other at a single point, there is also provided an advantage of eliminating a route through which a current flows and preventing possibility of an electric shock.

As mentioned above, because the resonance type power transmission device in accordance with this Embodiment 3 includes the plurality of resonators 4 for reception and is configured in such a way that the conductive substance 7 connects between the resonator 3 for transmission and the plurality of resonators 4 for reception, there is provided an advantage of being able to perform a supply of electric power to a wider area by using the single transmitter 8, in addition to the advantages provided by Embodiment 1. More specifically, in the case of using a conventional method, it is necessary to install a transmitter and a receiver while establishing a one-to-one correspondence between them, and hence the installation cost increases when performing a supply of electric power supply to a wide area. In contrast with this conventional method, because the present invention makes it possible to perform power transmission easily by connecting the single transmitter 8 to the plurality of receivers 9 by establishing a single line connection between the transmitter and the plurality of receivers, power transmission to a wide area can be carried out at a low cost.

Embodiment 4

Figure 18:
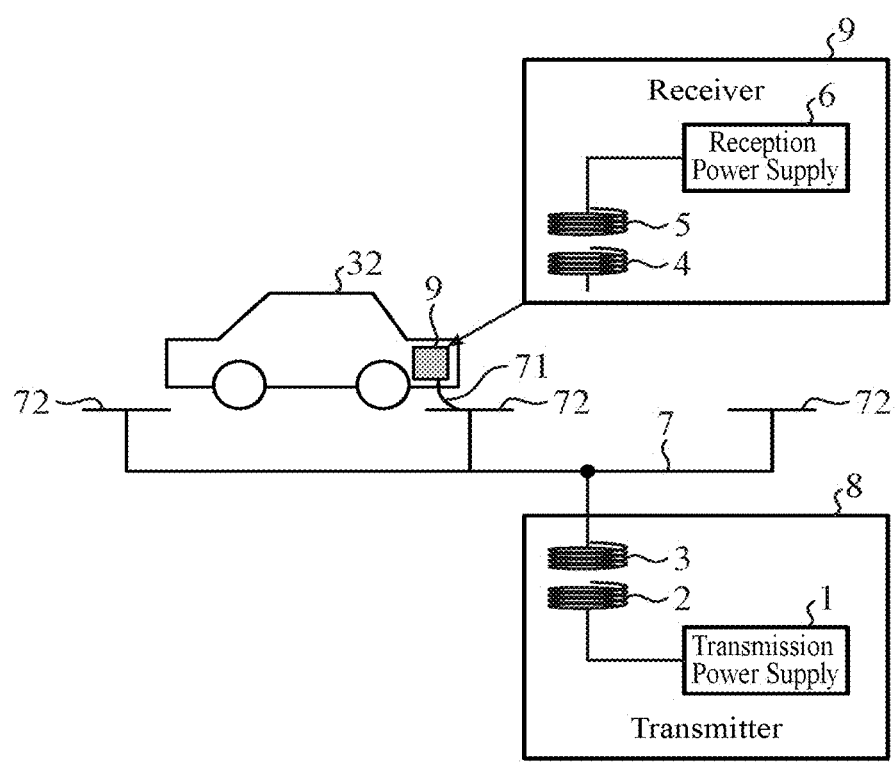
FIG. 18 is a diagram showing the configuration and an example of application of a resonance type power transmission device in accordance with Embodiment 4 of the present invention.

FIG. 18 is a diagram showing the configuration and an example of application of a resonance type power transmission device in accordance with Embodiment 4 of the present invention. The resonance type power transmission device in accordance with Embodiment 4 shown in this FIG. 18 is the one in which the conductive substance 7 of the resonance type power transmission device in accordance with Embodiment 1 shown in FIG. 1 is divided into two portions, and one of them is connected to a resonator 3 for transmission, and the other portion is connected to a resonator 4 for reception. When the both portions are brought into contact with each other, power transmission from a transmitter 8 to a receiver 9 can be carried out. The other components are the same as those of Embodiment 1, and they are designed by the same reference numerals and the explanation of the components will be omitted hereafter.

FIG. 18 shows an example of applying the present invention to a supply of electric power to a vehicle 32 parked in a parking area. In this case, in order to make it easy to come into contact with the conductive substance 7 (a contact line 71) connected to the receiver 9, a conductive tabular member, such as an electrode plate 72, is disposed at each end of the conductive substance 7 connected to the transmitter 8. This electrode plate 72 is placed on the ground surface of each parking area. As a result, when the vehicle 32 equipped with the receiver 9 having the contact line 71 is parked in the above-mentioned parking area, the electrode plate 72 is brought into contact with the contact line 71, so that the resonance type power transmission device can supply electric power to that vehicle 32.

Figure 19:
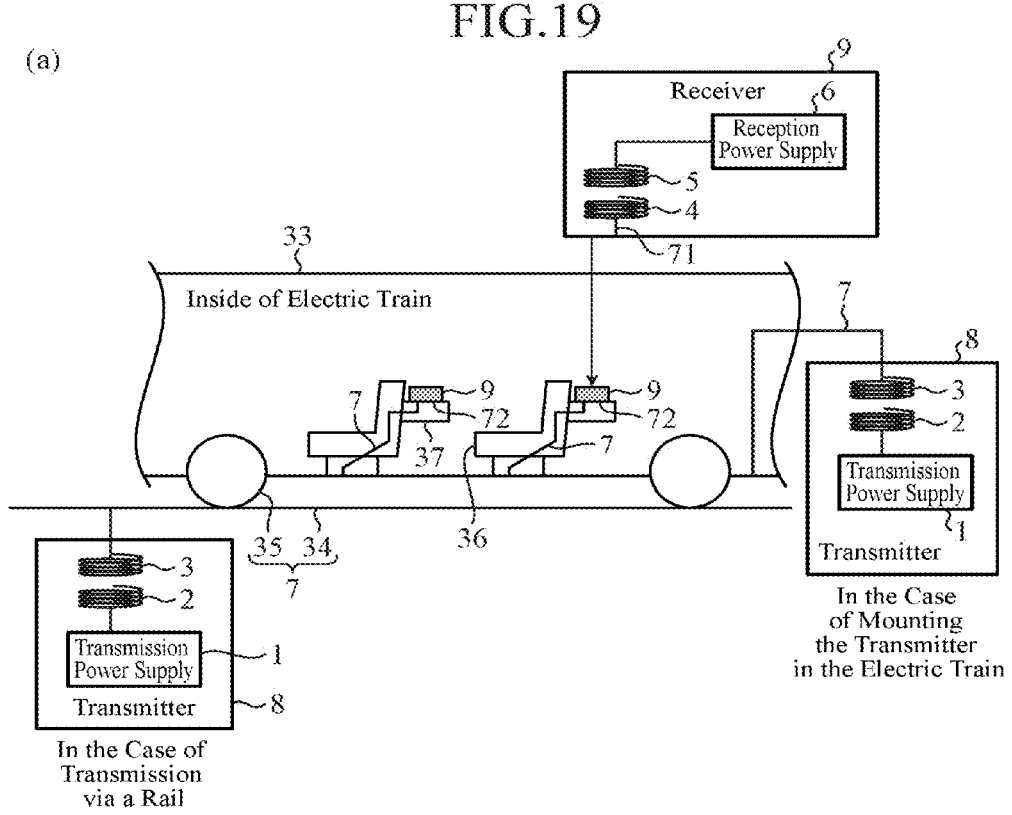
FIG. 19 is a diagram showing another example of application of the resonance type power transmission device in accordance with Embodiment 4 of the present invention.
Figure 19:
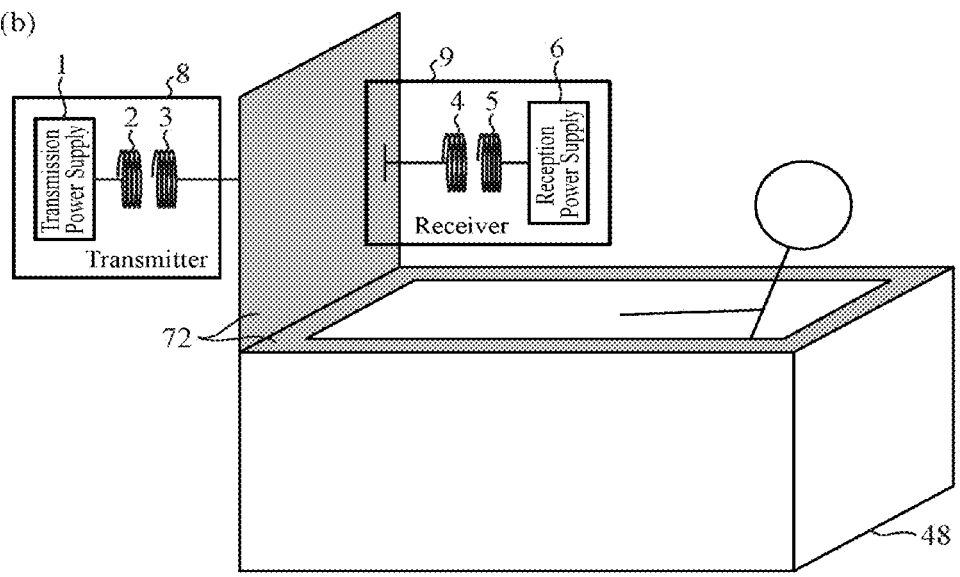

Further, FIG. 19(*a*) shows an example of applying the present invention to a supply of electric power to an electric train 33. In this example, an electrode plate 72 connected to the transmitter 8 is disposed on a table 37 for use in each rear seat 36 in the electric train. As a result, by simply placing equipment equipped with the receiver 9 having a contact line 71 on the electrode plate 72 of a table 37, the resonance type power transmission device can supply electric power to that equipment. The transmitter 8 is not necessarily disposed outside the electric train 33, and can be disposed in the electric train.

Further, FIG. 19(*b*) shows an example of applying the present invention to a bath 48. In this example, an electrode plate 72 connected to the transmitter 8 is disposed on a wall surface of the bath 48. As a result, by simply bringing equipment equipped with the receiver 9 having a contact structure (an attractive configuration using a magnet, or the like) into contact with the electrode plate 72 on the wall surface, the resonance type power transmission device can supply electric power to that equipment. In the present invention, because the transmit side and the receive side are connected to each other at a single point, there is also provided an advantage of eliminating a route through which a current flows and preventing possibility of an electric shock.

Figure 20:
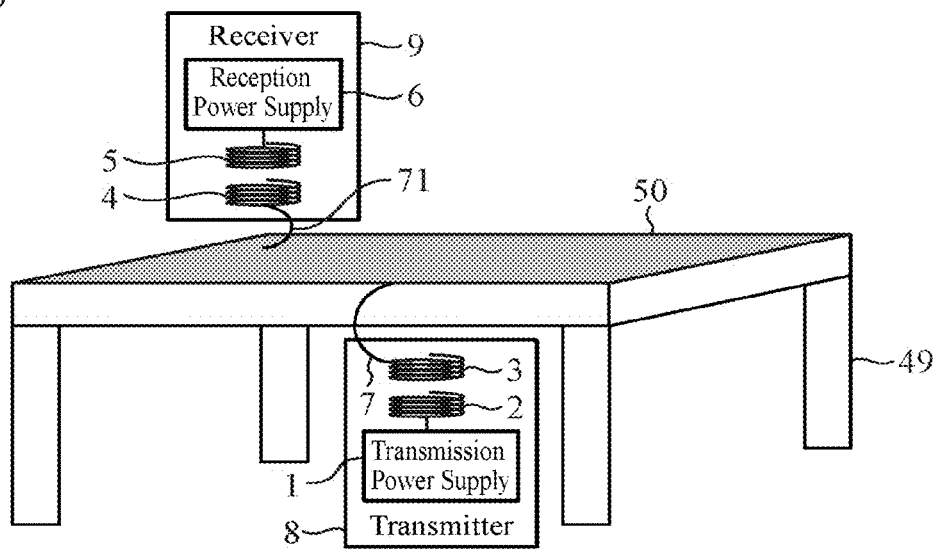
FIG. 20 is a diagram showing another example of application of the resonance type power transmission device in accordance with Embodiment 4 of the present invention.
Figure 20:
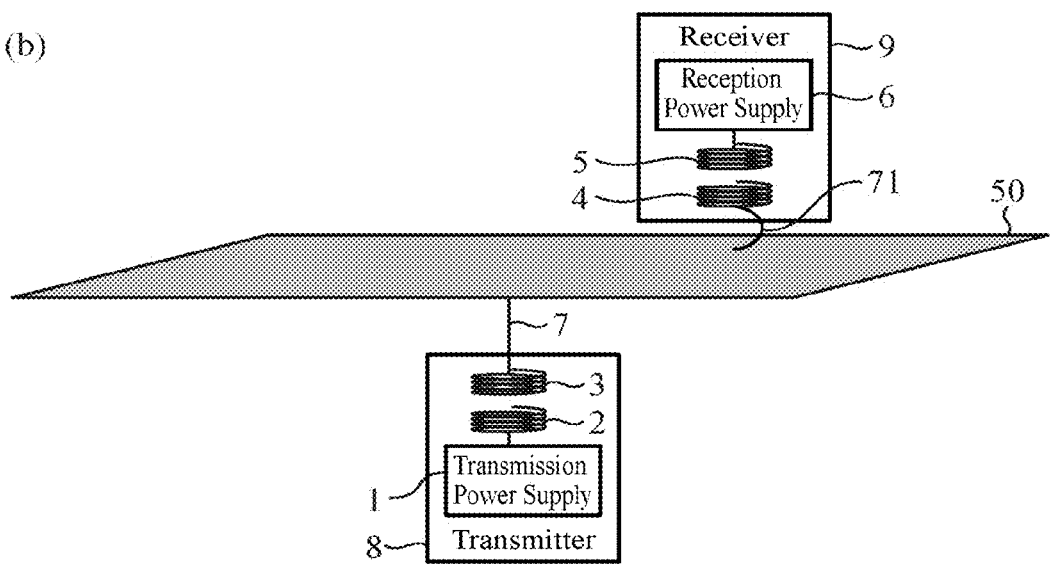

Further, FIG. 20(*a*) shows an example of applying the present invention to a table 49. In this example, a conductive sheet member 50 or the like which is connected to the transmitter 8 is stuck onto the table 49. As a result, by simply placing equipment equipped with the receiver 9 having a contact line 71 on the conductive sheet member 50, the resonance type power transmission device can supply electric power to that equipment.

Figure 21:
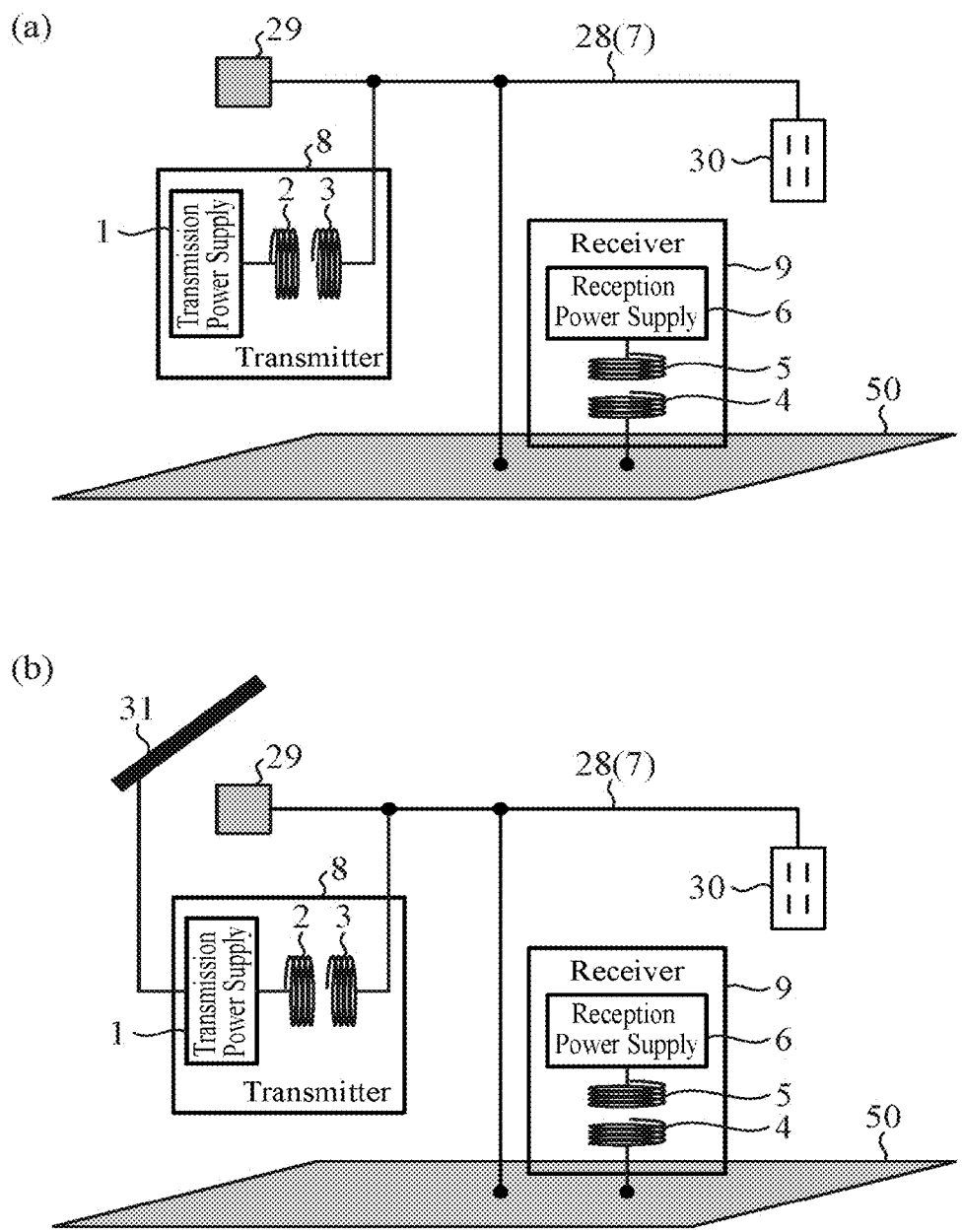
FIG. 21 is a diagram showing another example of application of the resonance type power transmission device in accordance with Embodiment 4 of the present invention.
Figure 22:
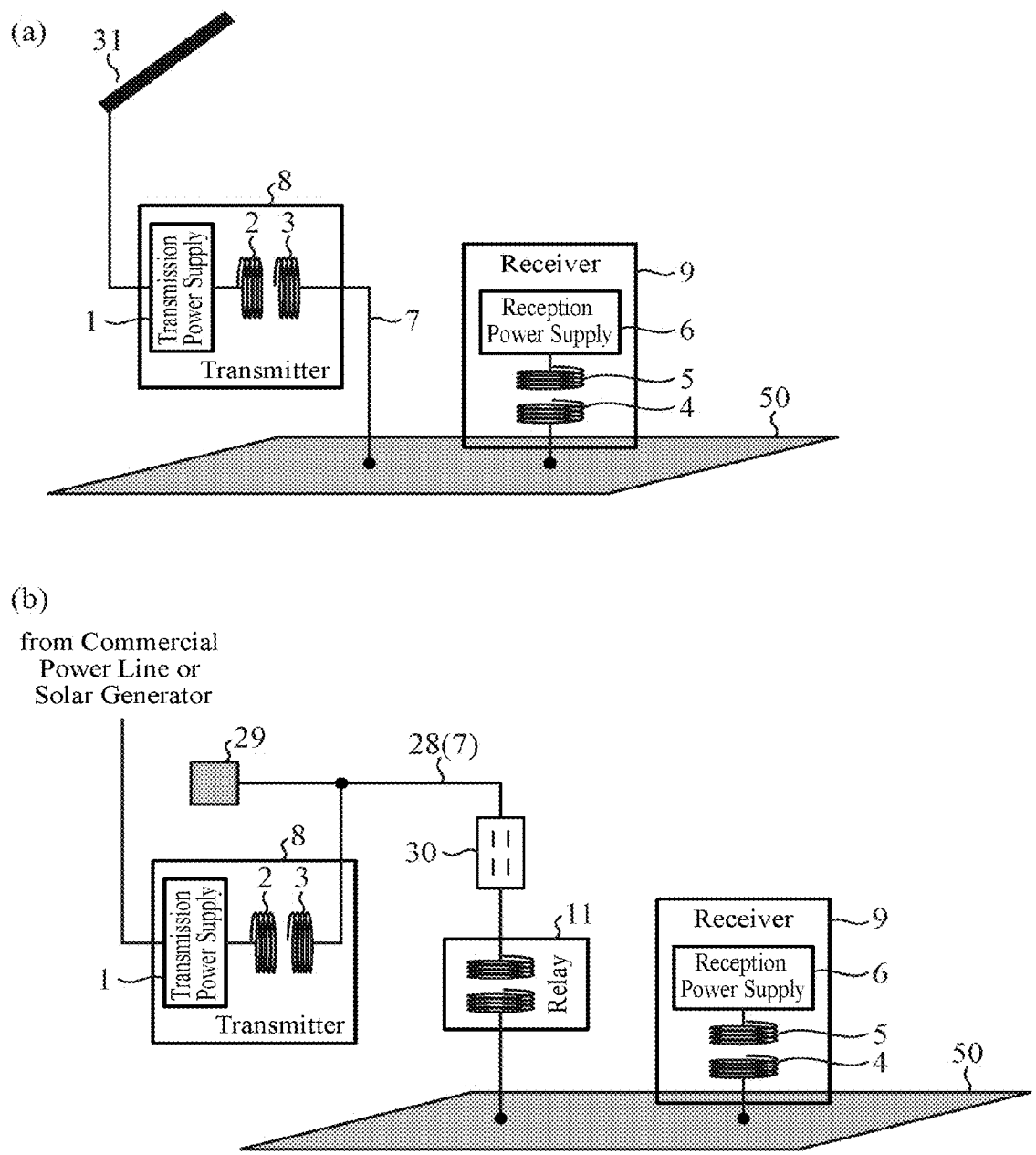
FIG. 22 is a diagram showing another example of application of the resonance type power transmission device in accordance with Embodiment 4 of the present invention.

Further, FIG. 20(*b*) shows an example of applying the present invention to a sheet member. In this example, a conductive sheet member 50 connected to the transmitter 8 is used as the sheet member. As a result, when equipment equipped with the receiver 9 having a contact line 71 is placed on the conductive sheet member 50, the resonance type power transmission device can supply electric power to that equipment. As shown in FIG. 21(*a*), the above-mentioned sheet member 50 can be used for a system in which an existing wiring 28 (or an existing electric wire 27) is used as the conductive substance 7 in accordance with the present invention. FIGS. 21(*b*) and 22(*a*) further show examples in which electric power generated by a solar generator 31 disposed outdoors is used as electric power for a transmission power supply 1. Further, FIG. 22(*b*) shows an example in which the conductive substance 7 is connected to the sheet member via one pole of an electrical outlet 30. Although a relay 11 is used in the example of FIG. 22(b), it is not necessary to use the relay.

Figure 23:
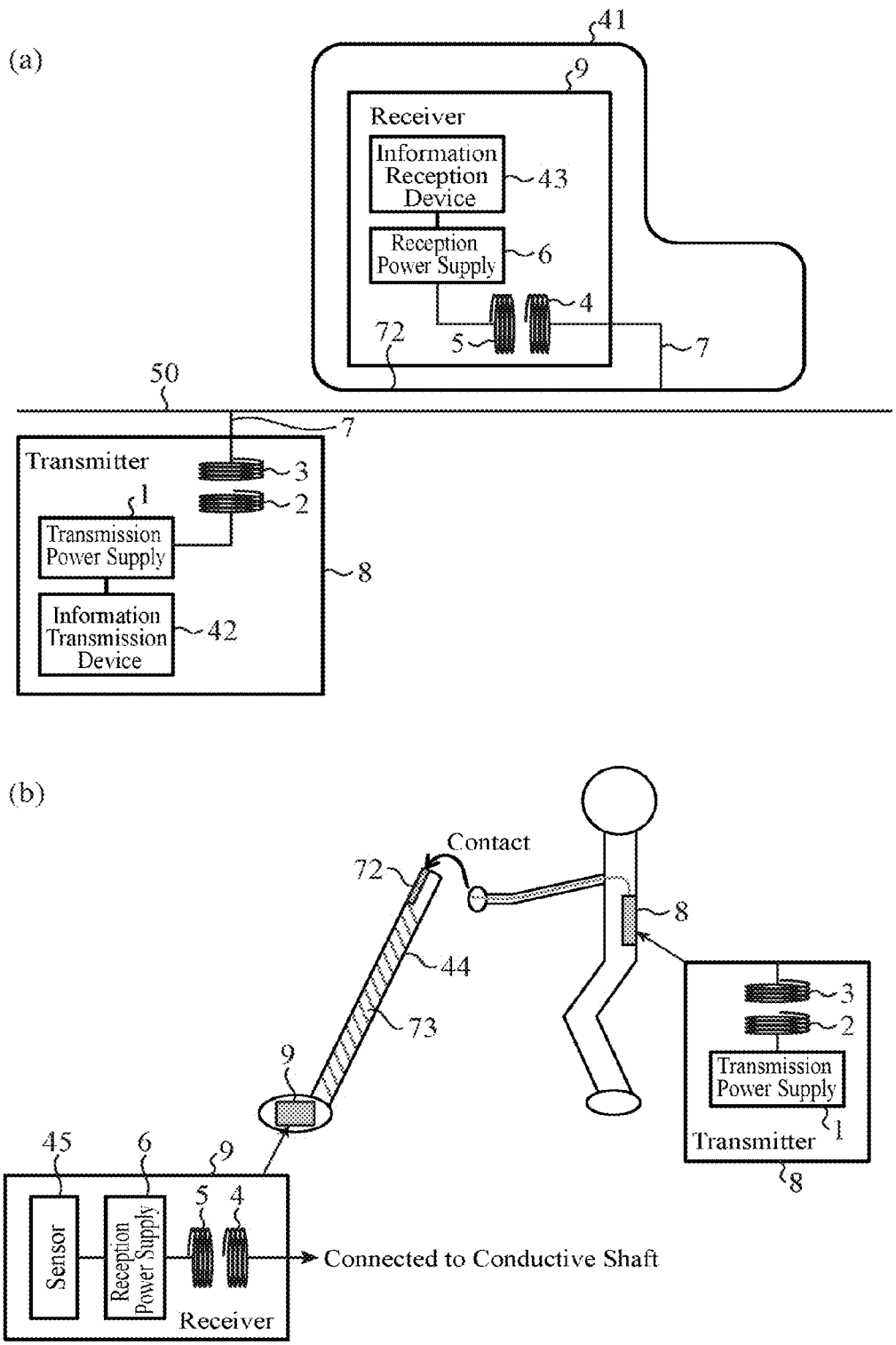
FIG. 23 is a diagram showing another example of application of the resonance type power transmission device in accordance with Embodiment 4 of the present invention.

Further, FIG. 23(a) shows an example of applying the present invention to a supply of electric power to a walking robot 41. In this example, a conductive sheet member 50 or the like which is connected to the transmitter 8 is disposed on a walking surface, and an electrode plate 72 connected to the receiver 9 is disposed on a bottom surface of a shoe of the walking robot 41. As a result, while the walking robot 41 is walking on the walking surface, the resonance type power transmission device can supply electric power to that walking robot 41. Further, by installing an information transmission device 42 in the transmitter 8, and also installing an information reception device 43 in the receiver 9, not only power transmission is carried out, but also transmission of information about the walk (the walking position, the direction, and so on) can be carried out. Further, this example can be applied not only to the walking robot 41 but also to shoes, a stick, a cleaner, and so on. When the present invention is applied to shoes, an application intended for, for example, visually impaired persons can be provided. More specifically, by installing a vibrator in the shoes and placing a conductive sheet member 50 connected to the transmitter 8 in each portion where conventional Braille for the feet is placed heretofore, instead of Braille for the feet, when those shoes are brought into contact with the conductive sheet member 50, Braille for the feet can be imitated by a vibration of the vibrator.

Further, FIG. 23(b) shows an example of applying the present invention to a supply of electric power to a sensor 45 to measure the acceleration, the pressure, the angle, and so on of a swing of a golf club 44. In this example, a user carries a mobile transmitter 8 in a pocket or the like, and the receiver 9 is disposed in a head portion of the golf club 44 consisting of a conductive shaft 73 and an electrode plate 72 connected to the receiver 9 via the conductive shaft 73 is disposed in a grip portion of the golf club. As a result, when the user grasps the golf club 44, the resonance type power transmission device can supply electric power to the sensor 45 of that golf club 44. As a result, it becomes unnecessary to dispose a battery for operating the sensor 45 in the golf club 44, and a weight reduction in the golf club 44 can be established. Further, the example can be applied not only to the golf club 44 but also to a tennis or table tennis racket, a bat, a fishing rod, mobile equipment, and so on.

Figure 24:
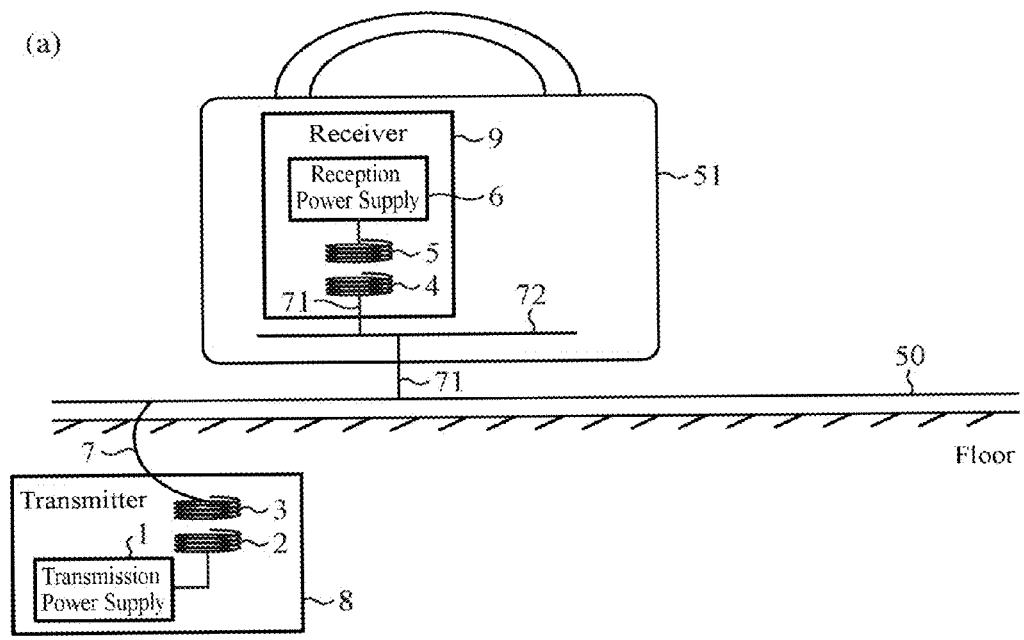
FIG. 24 is a diagram showing another example of application of the resonance type power transmission device in accordance with Embodiment 4 of the present invention.
Figure 24:
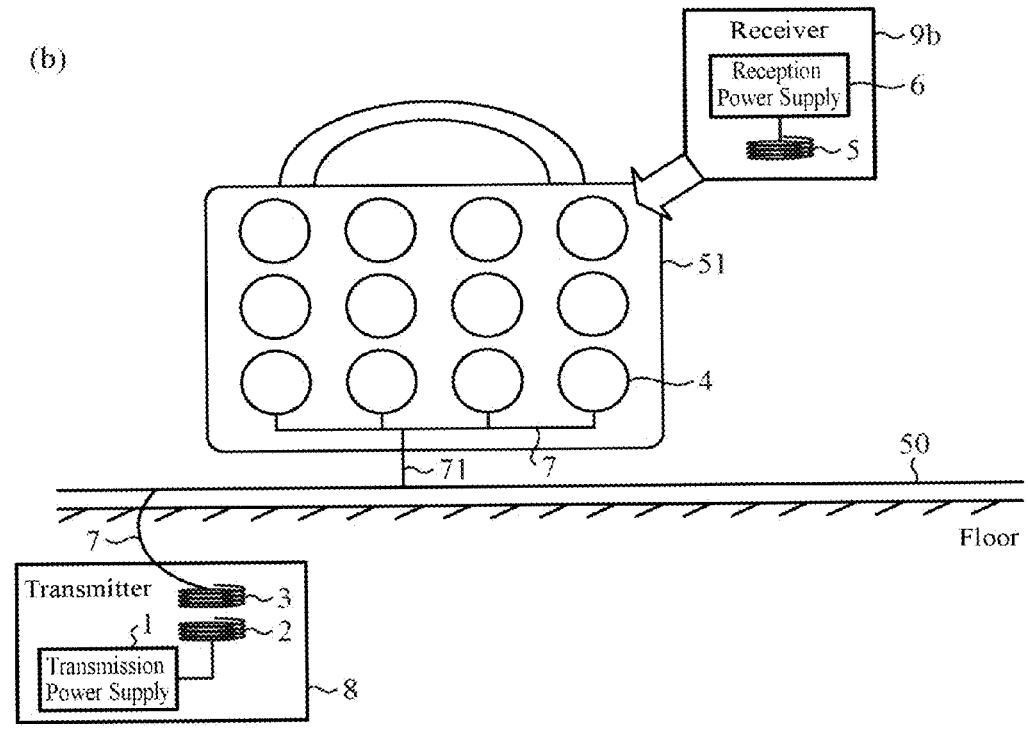

Further, FIG. 24(a) shows an example of applying the present invention to a supply of electric power to equipment in a bag 51. In this example, a conductive sheet member 50 connected to the transmitter 8 is disposed on a floor, and an electrode plate 72 connected to the receiver 9 is disposed in the bag 51. As a result, by simply placing the bag 51 on the conductive sheet member 50, the resonance type power transmission device can supply electric power to the receiver 9 in that bag 51. Further, FIG. 24(b) shows an example in which a plurality of resonators 4 for reception are disposed in the texture of a bag 51 in a planar form.

As mentioned above, the resonance type power transmission device in accordance with Embodiment 4 is configured in such a way that the conductive substance 7 is divided into two portions, and one of them is connected to the resonator 3 for transmission, and the other portion is connected to the resonator 4 for reception. Even in this embodiment, there can be provided the same advantages as those provided by Embodiment 3.

Embodiment 5

Figure 25:
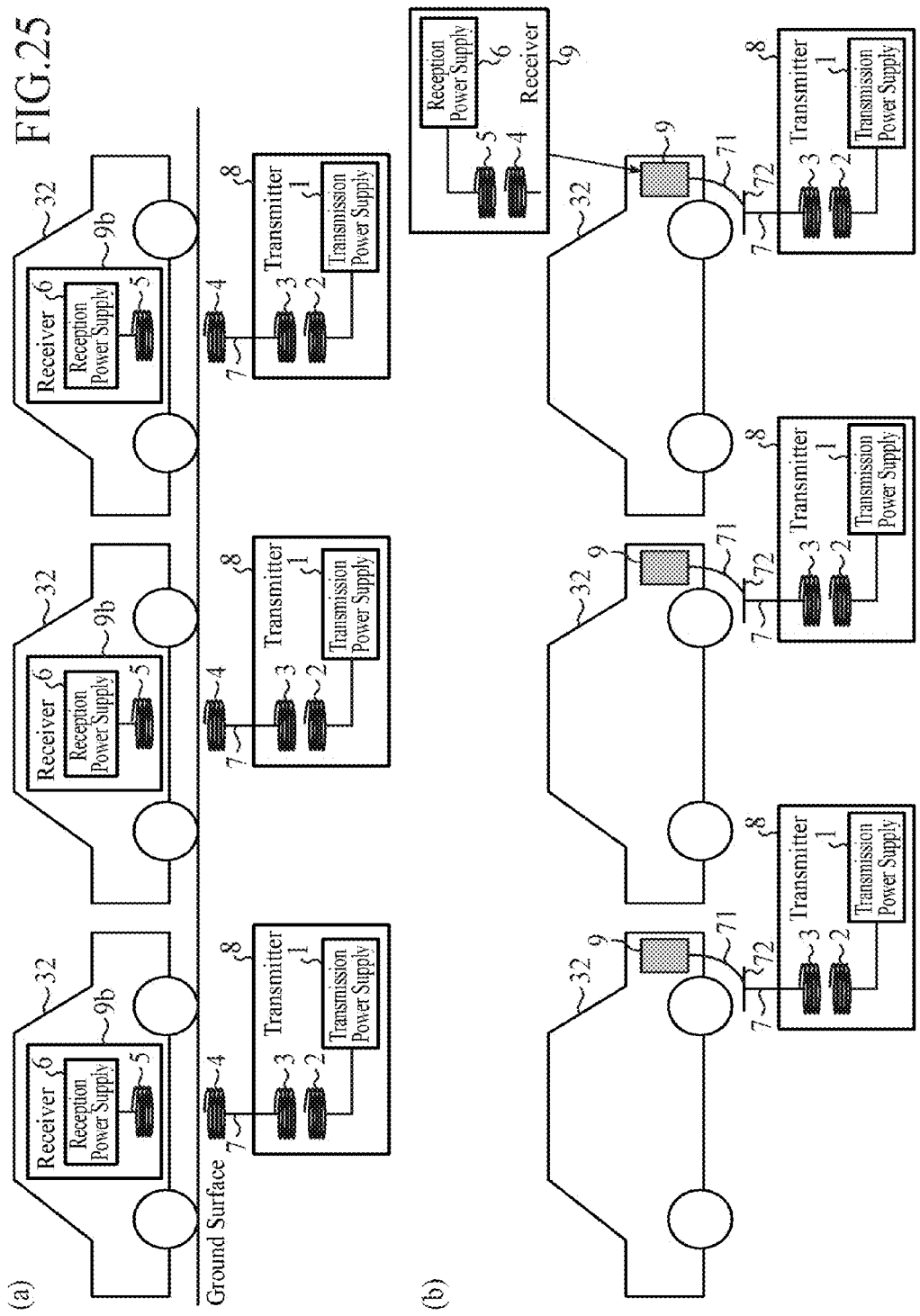
FIG. 25 is a diagram showing the configuration and an example of application of a resonance type power multiplex transmission system in accordance with Embodiment 5 of the present invention.

FIG. 25 is a diagram showing the configuration of a resonance type power multiplex transmission system in accordance with Embodiment 5 of the present invention. The resonance type power multiplex transmission system in accordance with Embodiment 5 shown in this FIG. 25 is the one in which a plurality of resonance type power transmission devices in accordance with Embodiment 1 shown in FIG. 1 are disposed. The other components are the same as those of Embodiment 1, and they are designed by the same reference numerals and the explanation of the components will be omitted hereafter.

By disposing a multiple number of resonance type power transmission devices, each in accordance with the present invention, as shown in FIG. 25, a system in which there is no mutual interference among the multiple devices and independent power transmission can be carried out can be provided. Because there is no mutual interference on each transmission route, a system configuration in which the multiple devices are brought close to one another can be implemented. Therefore, the present invention can be applied to a billing and information system for billing, for example, a vehicle 32 which has been parked in a parking area and charged.

Further, because there is no mutual interference on each transmission route and hence the frequency to be used can be fixed to one frequency, design satisfying restrictions according to the radio law can be performed easily by using an ISM band or the like. According to the above-mentioned configuration, a large increase in the transmission power, simplification of the electromagnetic shielding structure, and so on can be implemented.

FIG. 25(a) shows an example in which a resonator 4 for reception is disposed under the ground surface of each parking area, and FIG. 25(b) shows an example in which an electrode plate 72 is disposed on the ground surface of each parking area.

As mentioned above, because the resonance type power multiplex transmission system in accordance with Embodiment 5 of the present invention is configured in such a way that a multiple number of resonance type power transmission devices, each in accordance with the present invention, are disposed, there is no mutual interference among the multiple devices and independent power transmission can be carried out. Therefore, the resonance type power multiplex transmission system can be downsized. Further, because there is no mutual interference on each transmission route also in multiplex transmission and hence the frequency to be used can be fixed to one frequency, design satisfying restrictions according to the radio law can be performed easily by using an ISM band or the like. Therefore, a large increase in the transmission power, simplification of the electromagnetic shielding structure, and so on can be implemented.

Embodiment 6

Figure 26:
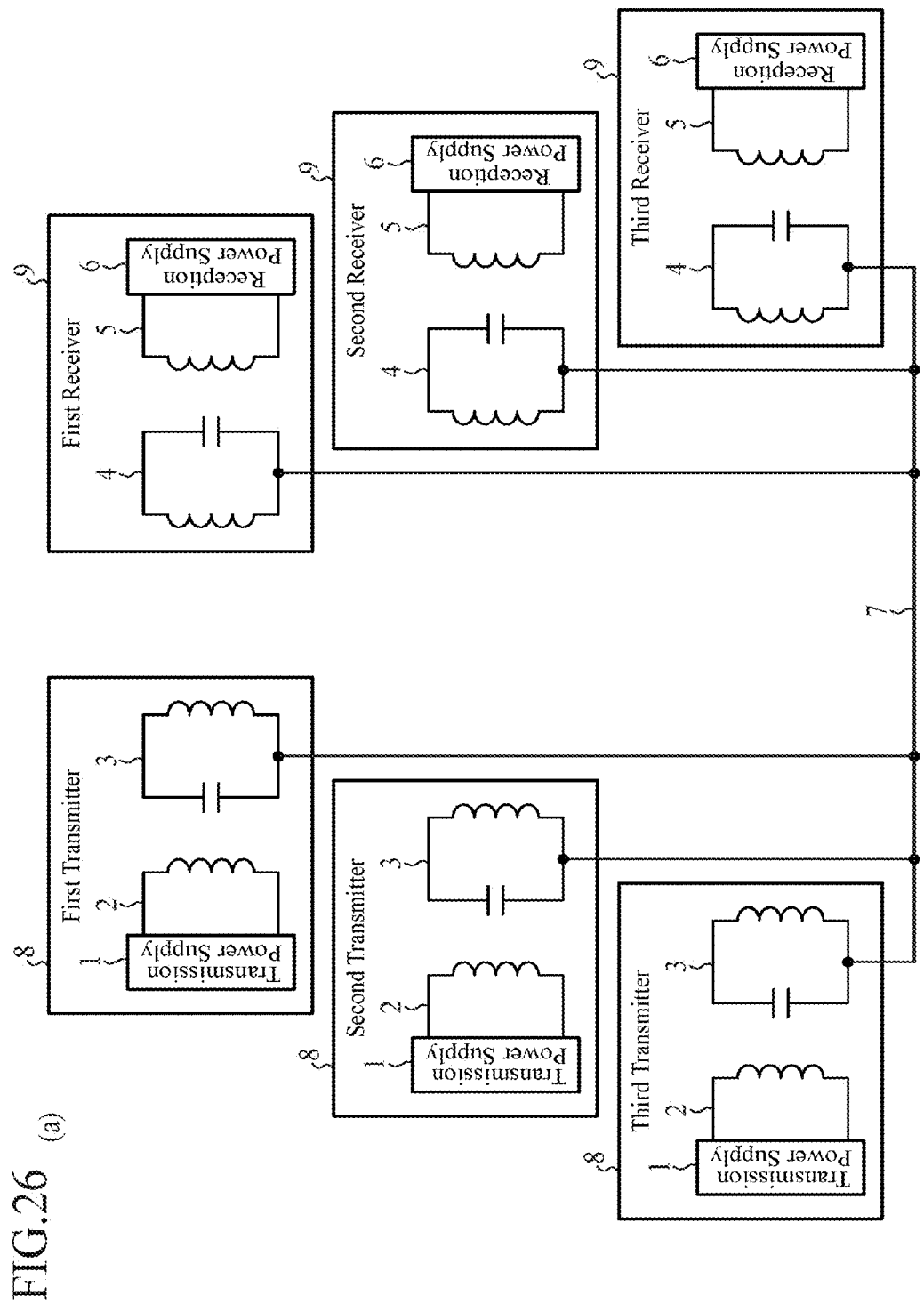
FIG. 26 is a circuit diagram showing the configuration of a resonance type power multiplex transmission system in accordance with Embodiment 6 of the present invention.

FIG. 26 is a circuit diagram showing the configuration of a resonance type power multiplex transmission system in accordance with Embodiment 6 of the present invention. The resonance type power multiplex transmission system in accordance with Embodiment 6 shown in this FIG. 26 is the one in which the conductive substances 7 of the resonance type power multiplex transmission system in accordance with Embodiment 5 shown in FIG. 25 are commonized. Even if the resonance type power multiplex transmission system is configured in this way, multiplex transmission can be carried out. In this case, also when one resonance type power transmission device stops operating due to a failure, other resonance type power transmission devices can be made to operate without being affected by the influence of the failure (failure isolation can be implemented). Therefore, the resonance type power multiplex transmission system can be used as an alternate function of a slip ring device used in an artificial satellite, wind power generation, etc.

As mentioned above, in the resonance type power multiplex transmission system in accordance with this Embodiment 6, the conductive substances 7 of the plurality of resonance type power transmission devices are commonized among them. Even if the resonance type power multiplex transmission system is configured in this way, the same advantages as those provided by Embodiment 5 can be provided.

Further, in Embodiments 1 to 6, the example in which each of the transmission and reception antennas 2 and 5 is configured with a single coil is shown. However, the present invention is not limited to this example. For example, each coil can be configured with a coil for electric supply and a coil for resonance, or can be configured with two or more coils.

Further, in Embodiments 1 to 6, the resonance condition of the reception antenna 5 varies according to the distance to the transmission antenna 2 with which the reception antenna 5 pairs up, the load current, the load impedance, etc. Therefore, in the receive side, a reception power supply circuit to make variable the resonance condition, which is satisfied for the reception antenna 5, according to such a variation of the transmission state can be added.

Similarly, in Embodiments 1 to 6, the resonance condition of the transmission antenna 2 varies according to the distance to the reception antenna 5 with which the transmission antenna pairs up, the load current, the load impedance, etc. Therefore, in the transmit side, a reception power supply circuit to make variable the resonance condition, which is satisfied for the transmission antenna 2, according to such a variation of the transmission state can be added.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

Because the resonance type power transmission device and the resonance type power multiplex transmission system in accordance with the present invention have a conductive substance to establish an electrical single point connection between a resonator for transmission and a resonator for reception can be produced at a low cost and downsized, and make it possible to carry out efficient power transmission, the resonance type power transmission device and the resonance type power multiplex transmission system are suitable for use for power transmission between electromagnetic wave shielding rooms, etc.

EXPLANATIONS OF REFERENCE NUMERALS

1 transmission power supply, 2 transmission antenna, 3 resonator for transmission, 4 resonator for reception, 5 reception antenna, 6 reception power supply, 7 conductive substance, 8 transmitter, 9 and 9b receiver, 10 resonator doubling as antenna, 11 relay, 20 car, 21, 21a, and 21b electromagnetic wave shielding room, 22 protective barrier, 23 moving object, 24 water pipe, 25 ship, 26 underwater device, 27 electric wire, 28 wire, 29 breaker, 30 electrical outlet, 31 solar generator, 32 vehicle, 33 electric train, 34 rail, 35 wheel, 36 seat, 37 table, 38 cordless iron, 39 ironing board, 40 sheet member, 41 walking robot, 42 information transmission device, 43 information reception device, 44 golf club, 45 sensor, 46 flying object, 47 bed, 48 bath, 49 table, 50 conductive sheet member, 51 bag, 71 contact line, 72 electrode plate, and 73 conductive shaft.

The invention claimed is:

1. A resonance type power transmission device comprising:
    a transmission resonance device;
    a reception resonance device whose resonance condition is matched to that of said transmission resonance device; and
    a conductive substance, insulated from ground, to establish an electrical single point connection as the only connection between respective hot sides or return sides of said transmission resonance device and said reception resonance device.

2. The resonance type power transmission device according to claim 1, wherein said transmission resonance device includes a transmission antenna and a transmission resonator which are configured separately, and said reception resonance device includes a reception antenna and a reception resonator which are configured separately.

3. The resonance type power transmission device according to claim 2, wherein each of said transmission and reception antennas is configured with two or more coils.

4. The resonance type power transmission device according to claim 1, wherein said resonance type power transmission device comprises a relay resonator disposed between said transmission resonance device and said reception resonance device, and whose resonance condition is matched to said resonance conditions.

5. The resonance type power transmission device according to claim 1, wherein a plurality of said reception resonance devices are disposed, and said conductive substance connects between said transmission resonance device and each of said plurality of reception resonance devices.

6. The resonance type power transmission device according to claim 1, wherein said conductive substance is divided into two portions, and one of the portions is connected to said transmission resonance device and the other portion is connected to said reception resonance device.

7. The resonance type power transmission device according to claim 1, wherein said transmission resonance device and said reception resonance device perform magnetic-field resonance.

8. The resonance type power transmission device according to claim 1, wherein said transmission resonance device and said reception resonance device perform electric-field resonance.

9. The resonance type power transmission device according to claim 1, wherein said transmission resonance device and said reception resonance device perform electromagnetic induction.

10. The resonance type power transmission device according to claim 1, wherein said resonance type power transmission device includes a reception power supply circuit to change the resonance condition of said reception resonance device according to a transmission state of said reception resonance device.

11. The resonance type power transmission device according to claim 1, wherein said resonance type power transmission device includes a transmission power supply circuit to change the resonance condition of said transmission resonance device according to a transmission state of said transmission resonance device.

12. The resonance type power transmission device according to claim 1, wherein the transmission resonance device and the reception resonance device are independently grounded.

13. A resonance type power multiplex transmission system including a plurality of resonance type power transmission devices each comprising a transmission resonance device and a reception resonance device whose resonance condition is matched to that of said transmission resonance device, each of said resonance type power transmission devices comprising:

a conductive substance, insulated from ground, to establish an electrical single point connection as the only connection between respective hot sides or return sides of said transmission resonance device and said reception resonance device.

14. The resonance type power multiplex transmission system according to claim 13, wherein the conductive substances of said plurality of resonance type power transmission devices are commonized among them.

15. A resonance type power transmission device comprising:

a transmission resonance device; and a connector to make a single point connection between a hot side or a return side, which is insulated from ground, of said transmission resonance device and a conductive substance.

16. A resonance type power reception device comprising:

a reception resonance device; and a connector to make a single point connection between a hot side or a return side, which is insulated from ground, of said reception resonance device and a conductive substance.

* * * * *